(12) United States Patent
Jeong

(10) Patent No.: US 10,754,532 B2
(45) Date of Patent: Aug. 25, 2020

(54) METHOD AND APPARATUS FOR OPERATING FUNCTION IN TOUCH DEVICE

(71) Applicant: Samsung Electronics Co., Ltd., Suwon-si, Gyeonggi-do (KR)

(72) Inventor: Jinhong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/516,805

(22) Filed: Jul. 19, 2019

(65) Prior Publication Data

US 2019/0339851 A1 Nov. 7, 2019

Related U.S. Application Data

(63) Continuation of application No. 15/700,707, filed on Sep. 11, 2017, now Pat. No. 10,359,925, which is a (Continued)

(30) Foreign Application Priority Data

Oct. 10, 2011 (KR) ........................ 10-2011-0102856

(51) Int. Cl.
*G06F 3/0484* (2013.01)
*G06F 3/0488* (2013.01)
*G06F 3/0485* (2013.01)

(52) U.S. Cl.
CPC ...... *G06F 3/04847* (2013.01); *G06F 3/04883* (2013.01); *G06F 3/04855* (2013.01)

(58) Field of Classification Search
CPC .... G06F 3/0416; G06F 3/0481; G06F 3/0482; G06F 3/04847; G06F 3/04855; G06F 3/0488; G06F 3/04883
See application file for complete search history.

(56) References Cited

U.S. PATENT DOCUMENTS 7,158,123 B2 1/2007 Myers et al.
7,231,229 B1 6/2007 Hawkins et al.
(Continued)

FOREIGN PATENT DOCUMENTS

CN 1761989 A 4/2006
CN 1967459 A 5/2007
(Continued)

OTHER PUBLICATIONS

Korean Decision to Grant a Patent dated Aug. 29, 2018, issued in the Korean application No. 10-2011-0102856.

*Primary Examiner* — Tom V Sheng
(74) *Attorney, Agent, or Firm* — Jefferson IP Law, LLP

(57) ABSTRACT

A method for operating a function in a touch device capable of simultaneously changing an option and executing the function based on an input touch event during execution of a function using a function button provided in a certain mode which is executed in a touch device supporting touch based input and an apparatus thereof is provided. The method includes executing a second function associated with option setting according to a touch event input to a function button; and executing a first function allocated to the function button according to an option value set by the second function when the input touch event is released.

20 Claims, 20 Drawing Sheets

Related U.S. Application Data continuation of application No. 14/566,018, filed on Dec. 10, 2014, now Pat. No. 9,760,269, which is a continuation of application No. 13/648,584, filed on Oct. 10, 2012, now Pat. No. 8,928,614.

(56) References Cited

U.S. PATENT DOCUMENTS

| | | | |
|---|---|---|---|
| 8,453,055 B2 * | 5/2013 | Oh | G06F 3/0482 715/702 |
| 8,578,294 B2 | 11/2013 | Eom et al. | |
| 8,928,614 B2 * | 1/2015 | Jeong | G06F 3/04847 345/173 |
| 9,041,658 B2 * | 5/2015 | Park | G06F 3/04883 345/173 |
| 9,760,269 B2 * | 9/2017 | Jeong | G06F 3/04847 |
| 9,880,642 B2 * | 1/2018 | Jeong | G06F 3/0488 |
| 10,359,925 B2 * | 7/2019 | Jeong | G06F 3/04847 |
| 2002/0176016 A1 | 11/2002 | Misawa et al. | |
| 2003/0142142 A1 | 7/2003 | Jaffe | |
| 2004/0140956 A1 | 7/2004 | Kushler et al. | |
| 2004/0150668 A1 | 8/2004 | Myers et al. | |
| 2005/0168449 A1 | 8/2005 | Katayose | |
| 2007/0135104 A1 | 6/2007 | Suzuki et al. | |
| 2007/0236475 A1 | 10/2007 | Wherry | |
| 2007/0277125 A1 * | 11/2007 | Shin | G06F 3/04883 715/863 |
| 2008/0163119 A1 | 7/2008 | Kim et al. | |
| 2008/0192020 A1 | 8/2008 | Kang et al. | |
| 2009/0058823 A1 * | 3/2009 | Kocienda | G06F 3/0236 345/173 |
| 2009/0061947 A1 | 3/2009 | Park et al. | |
| 2009/0213086 A1 * | 8/2009 | Chae | G06F 3/0482 345/173 |
| 2009/0237373 A1 | 9/2009 | Hansson | |
| 2009/0244019 A1 | 10/2009 | Choi | |
| 2009/0295945 A1 | 12/2009 | Watanabe et al. | |
| 2009/0315848 A1 | 12/2009 | Ku et al. | |
| 2009/0327963 A1 * | 12/2009 | Mouilleseaux | G06F 3/0482 715/834 |
| 2010/0056221 A1 | 3/2010 | Park | |
| 2010/0085303 A1 | 4/2010 | Kwok et al. | |
| 2010/0085314 A1 | 4/2010 | Kwok | |
| 2010/0095205 A1 | 4/2010 | Kinoshita | |
| 2010/0141594 A1 | 6/2010 | Kim | |
| 2010/0146451 A1 * | 6/2010 | Jun-Dong | G06F 3/0482 715/841 |
| 2010/0156941 A1 | 6/2010 | Seung | |
| 2010/0162108 A1 * | 6/2010 | Stallings | G06F 3/04817 715/702 |
| 2010/0162169 A1 * | 6/2010 | Skarp | G06F 3/0488 715/833 |
| 2010/0137031 A1 | 7/2010 | Griffin et al. | |
| 2010/0205558 A1 * | 8/2010 | Ng | G06F 3/0482 715/780 |
| 2010/0220067 A1 | 9/2010 | Yang | |
| 2010/0295805 A1 | 11/2010 | Shin et al. | |
| 2010/0306650 A1 | 12/2010 | Oh et al. | |
| 2011/0016390 A1 | 1/2011 | Oh et al. | |
| 2011/0019058 A1 | 1/2011 | Sakai et al. | |
| 2011/0055753 A1 * | 3/2011 | Horodezky | G06F 3/04883 715/810 |
| 2011/0066976 A1 * | 3/2011 | Hwang | G06F 3/04883 715/810 |
| 2011/0072373 A1 | 3/2011 | Yuki | |
| 2011/0087983 A1 * | 4/2011 | Shim | G06F 3/0482 715/769 |
| 2011/0256848 A1 | 10/2011 | Bok et al. | |
| 2012/0040724 A1 * | 2/2012 | Kim | H04M 1/72544 455/566 |
| 2012/0060129 A1 * | 3/2012 | Jang | G06F 3/0485 715/863 |
| 2012/0233545 A1 * | 9/2012 | Ikeda | G06F 3/0488 715/702 |
| 2013/0038541 A1 | 2/2013 | Bakker | |
| 2013/0070153 A1 * | 3/2013 | Hill | H04N 21/42228 348/569 |
| 2013/0088450 A1 * | 4/2013 | Takase | G06F 3/0485 345/173 |
| 2013/0113717 A1 * | 5/2013 | Van Eerd | G06F 3/04883 345/173 |
| 2013/0227419 A1 | 8/2013 | Lee et al. | |
| 2014/0145955 A1 | 5/2014 | Gomez et al. | |

FOREIGN PATENT DOCUMENTS

| | | |
|---|---|---|
| CN | 101546245 A | 9/2009 |
| CN | 101819499 A | 9/2010 |
| CN | 101901103 A | 12/2010 |
| JP | H11-305933 A | 11/1999 |
| JP | 2002-354311 A | 12/2002 |
| JP | 2007-133806 A | 5/2007 |
| JP | 2009-080306 A | 4/2009 |
| JP | 2010-154039 A | 7/2010 |
| JP | 2010-160581 A | 7/2010 |
| JP | 2010-204844 A | 9/2010 |
| JP | 2010-251844 A | 11/2010 |
| JP | 2010-268027 A | 11/2010 |
| JP | 2010-278962 A | 12/2010 |
| JP | 2011-028345 A | 2/2011 |
| KR | 10-2006-0017743 A | 2/2006 |
| KR | 10-2008-0061712 A | 7/2008 |
| KR | 10-2009-0125716 A | 12/2009 |
| KR | 10-2011-0055058 A | 5/2011 |
| KR | 10-2011-0091083 A | 11/2011 |
| RU | 2 419 832 C2 | 5/2011 |
| WO | 2010/109849 A1 | 9/2010 |
| WO | 2010/150566 A1 | 12/2010 |

\* cited by examiner

METHOD AND APPARATUS FOR OPERATING FUNCTION IN TOUCH DEVICE

CROSS-REFERENCE TO RELATED APPLICATION(S)

This application is a continuation application of prior application Ser. No. 15/700,707, filed on Sep. 11, 2017, which has issued as U.S. Pat. No. 10,359,925 on Jul. 23, 2019 and is a continuation application of prior application Ser. No. 14/566,018, filed on Dec. 10, 2014, which has issued as U.S. Pat. No. 9,760,269 on Sep. 12, 2017 and is a continuation application of prior U.S. application Ser. No. 13/648,584, filed Oct. 10, 2012, which has issued as U.S. Pat. No. 8,928,614 on Jan. 6, 2015 and claimed the benefit under 35 U.S.C § 119(a) of a Korean patent application filed on Oct. 10, 2011 in the Korean Intellectual Property Office and assigned Serial number 10-2011-0102856, the entire disclosure of which is hereby incorporated by reference.

BACKGROUND OF THE INVENTION

1. Field of the Invention

The present invention relates to a method and an apparatus for operating a function in a touch device. More particularly, the present invention relates to a method for operating a function in a touch device capable of simultaneously changing an option and executing the function based on an input touch event during execution of a function using a function button provided in a certain mode which is executed in a touch device supporting touch based input, and an apparatus thereof.

2. Description of the Related Art

In recent years, with the development of digital technology, mobile devices such as a Personal Digital Assistant (PDA), an electronic organizer, a smart phone, a tablet Personal Computer (PC) capable of processing communication and private information while moving have been developed. Through the rapid development of technology, such a mobile device has various functions, including voice call, SMS transmission, moving call, electronic organizer function, camera, e-mail, Internet, and Social Networking Service (SNS).

Recently, mobile devices having a touch screen have become widely available. The touch screen is a device for simultaneously supporting a display function of a display device and an input function of an input device. A user may operate a mobile device by action of touching a screen of the touch screen using a certain object (e.g., finger, point, pen, etc.). When using a mobile device with the touch screen, the user directly touches a corresponding point to input while viewing a screen. Even users not accustomed to using the mobile device may easily use various functions of the touch screen.

Mobile devices have supported execution of a function using a function button provided during execution of a certain mode. Mobile device have also supported various option menus associated with a corresponding function during execution of a certain function in the certain mode. For example, the user may execute a photographing function using a photographing button given in a photographing mode. In addition, the mobile device has supported an option menu for changing various options (e.g., white balance, brightness, exposure, resolution, ISO, etc.) associated with photographing during execution of a photographing function in a photographing mode. Similarly, in a broadcasting mode for watching a mobile broadcasting, the user may execute a recording function using a recording button given in the broadcasting mode. During execution of a recording function, an option menu for changing various options (e.g., channel list, recording date, recording time, recording start time, recording end time) associated with recording is provided. In a messenger mode for chatting between users, the user may execute a transmission function of input texts using a transmission button give in the messenger mode. During execution of a transmission function in a messenger mode, an option menu for changing various options (e.g., font type, the font color, language) associated with an input test has been supported.

However, in a touch based mobile device of the related art, execution of a function using a function button in the foregoing certain mode may be simply performed through touch based input. Meanwhile, for changing various options given in each certain mode, a desired option may be selected by only calling an option menu and passing through great depth in the called option menu. Further, it is inconvenient for a user to separately perform an operation for changing an option value of the selected option. For example, a photographing function may be executed by only touching a photographing button in a photographing mode. However, the user needs to perform a complex procedure to change and set certain options and then to execute the photographing function. For example, to change and set an option value such as a white balance, the user may perform a complicated procedure such as calling an option menu, searching and selecting a white balance menu in a given option menu, selecting a desired option value from the given white balance menu, and applying an optional setting value; changing an option; and executing a function by pressing a photographing button or performing another input action many times. This inconvenience of the user also occurs in the broadcasting mode and the messenger mode.

Typically, when the user changes an optional option value in a certain mode of a mobile device and then executes a function according thereto, there is an inconvenience that the user needs to perform a complicated menu operation and to perform an operation according to setting an optional modification and execution of a function many times. However, in the related art, as the foregoing complicated procedures are performed, it takes a long time to execute a desired function. Because an optional menu search and option setting are not intuitively supported, it is very difficult for a user to change the option.

SUMMARY OF THE INVENTION

Aspects of the present invention are to address at least the above-mentioned problems and/or disadvantages and to provide at least the advantages described below. Accordingly, an aspect of the present invention is to provide a method for controlling a function in a touch device which may improve convenience of user input for changing various option values used during a function operation in a touch device supporting touch based input, and an apparatus thereof.

Another aspect of the present invention is to provide a method for controlling a function in a touch device which may rapidly and intuitively change various option values used during execution of a certain function in a touch device and execute a certain function based on the changed optional values, and an apparatus thereof.

Another aspect of the present invention is to provide a method for controlling a function in a touch device which may set various option values by one touch input using a function button provided according to an execution mode in a touch device and execute a function allocated to a function button based on at least set option value, and an apparatus thereof.

Another aspect of the present invention is to provide a method for controlling a function in a touch device which may implement an optimal environment for supporting a function operation according to change in an optional value of a user in a touch device to improve convenience for the user, usability of the touch device, and a competitive force of the touch device, and an apparatus thereof.

According to a first aspect of the present invention there is provided a method for controlling a function in a touch device, the method comprising: executing an option setting function according to a touch event input associated with a displayed function button, the option setting function comprising setting an option value; and executing a function allocated to the function button according to the set option value when the touch event input is released.

According to a second aspect of the present invention there is provided a touch device comprising: a display unit arranged to display a function button and arranged to receive a touch event input; a memory arranged to store information for implementing an option setting function and for implementing a function allocated to the function button; and a controller arranged to execute an option setting function according to a touch event input associated with the displayed function button, the option setting function comprising setting an option value, and further arranged to execute the function allocated to the function button according to the set option value when the touch event input is released.

In accordance with an aspect of the present invention, a method for controlling a function in a touch device is provided. The method includes executing a second function associated with option setting according to a touch event input to a function button, and executing a first function allocated to the function button according to an option value set by the second function when the input touch event is released.

In accordance with another aspect of the present invention, a method for controlling a function in a touch device is provided. The method includes detecting a touch event input in a function button displayed in a certain mode, displaying an option menu in response to the touch event input, detecting movement of the touch event while the option menu is displayed, changing an option value based on the option menu according to the movement of the touch event, and executing a function of the function button based on the changed option value when the touch event is released.

In accordance with another aspect of the present invention, a method for controlling a function in a touch device is provided. The method includes receiving a touch event input through a function button displayed on a screen, executing an unique function of the function button when the touch event is released within a predetermined time, displaying a menu setting an option associated with the unique function when a predetermined time elapses after the touch event is inputted to the function button, setting the option value when the touch event is moved corresponding to the menu while the touch event is not released, and reflecting the set option value to execute the unique function of the function button when the touch event is released.

In accordance with another aspect of the present invention, a photographing method in a touch device is provided. The method includes a photographing method in a touch device, includes: receiving a touch event input through a photographing button displayed on a screen, performing photographing when the touch event is released within a predetermined time, displaying a menu setting an option associated with the photographing when the touch event maintains for greater than a predetermined time after the touch event is inputted to the photographing button, setting the option value when the touch event is moved corresponding to the menu while the touch event is not released, and performing photographing to which the set option value is applied when the touch event is released.

In accordance with another aspect of the present invention, a computer readable recording medium recording a program to be executed by a processor is provided.

In accordance with another aspect of the present invention, a computer readable recording medium stores a program to be executed by a processor is provided. The recording medium stores includes displaying a function button on a screen, processing a first mode executing an unique function of a function button when a touch event input through the function button is released within a predetermined time, displaying a menu setting an option associated with the unique function when the touch event input through the function button maintains for greater than a predetermined time, setting the option value when the touch event is moved corresponding to the menu in a state that the touch event is not released, and processing a second mode of reflecting the set option value to execute the unique function of the function button when the touch event is released.

In accordance with another aspect of the present invention, a touch device is provided. The touch device includes a display unit for displaying a function region for providing at least one soft type function button for executing a function in a certain mode during execution of the certain mode and a display region for displaying related data operated according to a touch event input through the function button of the function region, a memory for storing at least one option menu given by the certain mode, a corresponding option setting value, and preset information for a function operation of the touch device, and a controller for changing at least one option value with respect to at least one option menu according to a touch event input through the function button in the certain mode and for controlling execution of a function of the function button based on the at least one changed option value when the touch event is released.

In accordance with another aspect of the present invention, a touch device is provided. The touch device includes a touch screen displaying a function button for performing an unique function and receiving a touch event input through the function button, a controller controlling a first mode executing the unique function of the function button when the touch event is released within a predetermined time, displaying a menu setting an option associated with the unique function when the touch event maintains for greater than a predetermined time, setting the option value when the touch event is moved in a state that the touch event is not released, and controlling a second mode of reflecting the set option value to execute the unique function of the function button when the touch event is released.

In accordance with another aspect of the present invention, a touch device is provided. The touch device includes a camera module, a touch screen displaying a photographing button for performing photographing using the camera module, and receiving a touch event input for performing the photographing through the photographing button, a controller controlling a first mode executing photographing when the touch event is released within a predetermined time, displaying a menu setting an option associated with the photographing when the touch event maintains for greater than a predetermined time, setting the option value when the touch event is moved in a state that the touch event is not released, and controlling a second mode of executing photographing to which the set option value is applied when the touch event is released.

According to certain embodiments the option menu or option controller is displayed in a form greater than one dimension.

Releasing the touch event input within the predetermined time may comprise the touch event being released from the photographing button, and releasing the touch event after the predetermined time elapses may comprise releasing the touch event input from the option menu.

Another aspect of the invention provides a computer program comprising instructions arranged, when executed, to implement a method and/or apparatus in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
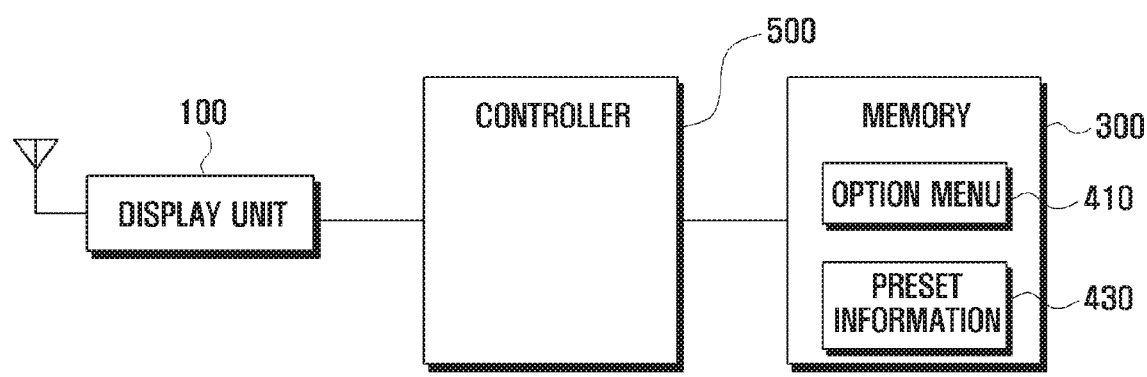
FIG. 1 is a block diagram schematically illustrating a configuration of a touch device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the description and claims of this specification, the words "comprise" and "contain" and variations of the words, for example "comprising" and "comprises", means "including but not limited to", and is not intended to (and does not) exclude other moieties, additives, components, integers or steps.

Features, integers, characteristics, or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Exemplary embodiments of the present invention relate to a method for operating a function in a touch device which may operate a complex function by one touch event input using a function button provided according to an execution mode in a touch device supporting a touch based input, and an apparatus thereof. Exemplary embodiments of the present invention may change an option value according to touch event input to a function button given by certain modes, and execute a corresponding function allocated to the function button with the change option value during release of the touch event. Exemplary embodiments of the present invention may execute a function (option change function) associated with option setting according to a touch event input to the function button, and reflect an option value set by the option change function during execution of a function (button function) allocated to the function button according to release of the input touch event to execute the button function.

According to exemplary embodiments of the present invention, the touch event may be interpreted as a first event for directly executing a corresponding function of a function button given in an execution mode according to a form input to the function button or a second event for setting an option based on the function button and executing a corresponding function of the function button based on the set option.

For example, when both input and release of the touch event are executed for the function button within a certain time, the touch event is determined as the first event and a corresponding function of the function button may be directly executed. When the touch event is input to the function button for greater than a predetermined time, the touch event may be determined as the second event.

When the touch event is determined as the second event, an option menu call according to the touch event input on a function button of a touch screen, an option change according to movement in an option menu while input of the touch event remains on the touch screen, and a corresponding function of a function button based on an option set during a touch event retained on the touch screen is released on an option menu may be executed.

Further, the touch event includes inputs for an option menu call before executing a function by the function button as described above (a state that a predetermined time elapses and maintains after input of the function button), movement to the option menu while maintaining an input on the touch screen (corresponding to a case where an option menu is provided to be spaced apart from the function button), an option change due to movement into the option menu while maintaining the input on the touch screen, and an option change according to movement into an additional option menu.

As used herein, a touch event input indicates a state in which an object (e.g., finger, point, pen, etc.) for user input touches one region of a touch screen. The retain state denotes a state in which the object remains in contact with the touched region or moves from the touched region to another region, and indicates all states before the object is separated (released) from the touch screen. Release of the touch event denotes a state in which the object in contact with the touch screen is separated (released) from the touch screen.

Accordingly, the touch event may be classified into an interaction for executing a function allocated to a function button (action whose input and release are achieved within a predetermined time), an interaction for calling an option menu allocated to a function button before executing a function due to a corresponding function button (action in which input and retain are achieved on a function button for greater than a predetermined time), an interaction for changing an option value according to a called option menu (action moving to a predetermined region while retaining input), and an interaction for executing a function allocated to a function button after changing an option value (action for separating an object from a moved region while retaining input). In addition, the touch event having the classified interactions as described above may be regarded as one input of a user for setting an option and executing a function of the present invention. Exemplary embodiments of the present invention may execute a plurality of functions by one touch based on one finger. Accordingly, before a touch event input to a function button is released, exemplary embodiments of the present invention detect an interaction according to change (input, retain, movement, release) of one touch event as described above, and may accordingly perform activation of an option menu, option change based on the option menu, and execution of a function according to a changed option simultaneously.

According to exemplary embodiments of the present invention, change of an option and execution of a function may be performed by one user input action using a function button based on one touch. The change of an option and execution of a function may be performed by one user input action using a function button in such a way that a first function being an unique function allocated to a function button during release of the touch event after a second function (option setting function) changing at least one option value according to input touch event in executing the first unique function (unique function) allocated to the function button. Accordingly, exemplary embodiments of the present invention may change a multi-option value by one touch event, and execute a function allocated to a function button based on the changed option value.

A configuration of a touch device and a method for controlling an operation of the touch device is described with reference to accompanying drawings. However, because a configuration of a touch device and a method of controlling an operation thereof according to an embodiment is not limited to following contents, it will be noticed that they are applicable to various embodiments based on the following description.

FIG. 1 is a block diagram schematically illustrating a configuration of a touch device according to an exemplary embodiment of the present invention.

Referring to FIG. 1, a touch device according to an exemplary embodiment of the present invention includes a display unit 100, a memory 300, and a controller 500. The touch device may further include additional units not shown, such as an audio processor having a microphone and a speaker; a digital broadcasting module for receiving digital broadcasting (e.g., mobile broadcasting such as Digital Multimedia Broadcasting (DMB) or Digital Video Broadcasting (DVB)); a camera module for photographing a still image and a moving image of a subject; at least one near distance communication module for supporting a near distance wireless communication based function such as Radio Frequency Identification (RFID) communication or Near Field Communication (NFC); an input unit for supporting input based on a hard key; an RF module for supporting a communication function such as mobile communication based voice call, moving call, and data call; a communication module for supporting Internet Protocol (IP) based Internet communication service; and a battery for supplying power to the foregoing structural elements.

The display unit 100 may display an operation state of a touch device and a screen associated with a performing operation thereof. For example, the display unit 100 may display a home screen of the touch device or respective execution screens according to execution of various applications. A Liquid Crystal Display (LCD) may be used as the display unit 100. However, other display devices such as Light Emitting Diode (LED), Organic LED (OLED), or Active Matrix OLED (AMOLED) may also be used. The display unit 100 further includes an interface supporting touch based input. For example, the display unit 100 may support various touch based user inputs by a touch screen, generate an input signal according to user input, and transfer the input signal to the controller 500. When displaying the execution screen, the display unit 100 may support screen display in a landscape mode, screen display in a transverse mode, and adaptive screen conversion display according to variation between the landscape mode and the transverse mode in a rotating direction (or put direction) of the touch device.

The display unit 100 may provide a function region providing at least one soft type function button for executing a function in a certain mode in which a certain application is executed and a display region for displaying relation data operated according to a touch event input through a function button of the function region. Various function buttons may be provided in a certain mode executed in a case of the function region. The display unit 100 may express a result screen of an executed function with a changed option through the display region according to a touch event of a user using a given function button in a certain mode. A screen configuration of the display unit 100 and a screen example thereof will be described later.

The memory 300 stores various applications executed and processed by the touch device and data, and may include at least one volatile memory and non-volatile memory. The volatile memory may include a Random Access Memory (RAM), and the non-volatile memory may include a Read Only Memory (ROM), or a flash memory. The memory 300 may continuously or temporarily store an operating system of the touch device, a program and data associated with a display control operation of the display unit 100, a program and data associated with an input control operation using the display unit 100, a program and data associated with a function operation of the touch device, and a program and data associated with a control operation for supporting option change by a touch based one touch input and execution of the function in the touch device.

In addition, the memory 300 may store various option menus 410 given by certain modes and an option setting value according thereto. The memory 300 may also store various preset information necessary for function operation of the present invention. An example of the option menu 410 and an option setting value according thereto is described below. The preset information 430 may include information about a function allocated to a function button given by certain modes, at least one option menu operated by the function button, and previously set information with respect to an option menu order provided according to a moving path of a touch event during providing a multi-option menu by the function button.

The controller 500 controls an overall operation of the touch device. The controller 500 may change an option according to touch based user input of the touch device and control an operation associated with execution of a function acceding to user input based the changed option value. The controller 500 may change an option value with respect to at least one option menu according to a touch event input through a function button in an executed certain mode and control execution of a function of the function button based on the at least one changed option value. For example, the controller 500 may activate an option menu when a touch event input while a function button of a function region is displayed in a certain mode, and change and set an option according to movement of the input touch event on the active option menu. When the touch event is released, the controller 500 may control execution of a corresponding function allocated to a function button based on the changed set option value.

An option menu may be an array or list of options, which may for instance comprise text identifying different option values or symbols representing different options. Setting an option value from an option menu may be considered to comprise selecting one of a predetermined group of discrete option values. An option controller may provide the ability to select an option value from a group of discrete option values or from a continuous range of option values, and may for instance be implemented as a slider for which the position of the touch event input along a first axis of the slider determines the selected option value.

When touch event input is detected on a given function button in a certain mode, the controller 500 may control display of an option menu in response to the touch event input. When movement of the touch event is detected in a displayed state of the optional menu, the controller 500 may change an option value based on the option menu according to the movement of the touch event. In this case, when the optional value is changed, the controller 500 may control real-time display of a screen changed according to change in the option value in a currently executed certain mode. When the release of the touch event is detected, the controller 500 may execute a corresponding function of the function button based on an option value during the release of the touch event, and control a result screen display thereof. As described above, the controller 500 may control an overall operation with respect to execution of a function acceding to change in an option of the present invention.

The touch event may be classified into an interaction for executing a function allocated to a certain function button on the function region, an interaction for calling an option menu allocated to a function button before executing a function due to a corresponding function button, an interaction moved to change an option value acceding to a called option menu, and an interaction for executing a function allocated to a function button after changing an option value. The touch event may correspond to one input of the user. A function of the touch device may be executed by one touch based on one finger. An option change and function execution operation according to the touch event is described below with reference to the drawings. Accordingly, the controller 500 may detect an interaction according to a change in at least one touch event before a touch event input on a function button is released, and may collectively control activation of the option menu, option change based on the option menu, and execution of a function by the changed option.

As described above, a control operation of the controller 500 is described below with reference to operation examples of the touch device and a control method thereof. The controller 500 may control various operations associated with a typical function of the touch device as well as the foregoing function. For example, the controller 500 may control an operation and screen display of a certain application during execution of the certain application. The controller 500 may receive an input signal corresponding to various touch event inputs supported from an input interface based on the touch and control a function operation thereto. In addition, the controller 500 may control transmission/reception of various data based on wired communication and wireless communication.

The touch device shown in FIG. 1 may be any type of device, such as bar type, folder type, slide type, swing type, and flip type. The touch device of the present invention may include various information and communication devices, such as a multi-media device, and an application device thereof supporting a function of the present invention. For example, the touch device may be a Personal Computer (PC), a Smart Phone, a digital camera, a Portable Multimedia Player (PMP), a Media Player, a portable game terminal, a laptop computer, and a Personal Digital Assistant (PDA) as well as a mobile communication terminal operated based on respective communication protocols corresponding to various communication systems. The function control method according to exemplary embodiments of the present invention may be applied and operated to various display devices supporting touch based input such as a Digital Television (TV), Digital Signage (DS), and a Large Format Display (LFD).

FIGS. 2 to 5 are diagrams schematically illustrating a function control operation of a touch device according to an exemplary embodiment of the present invention.

Figure 2:
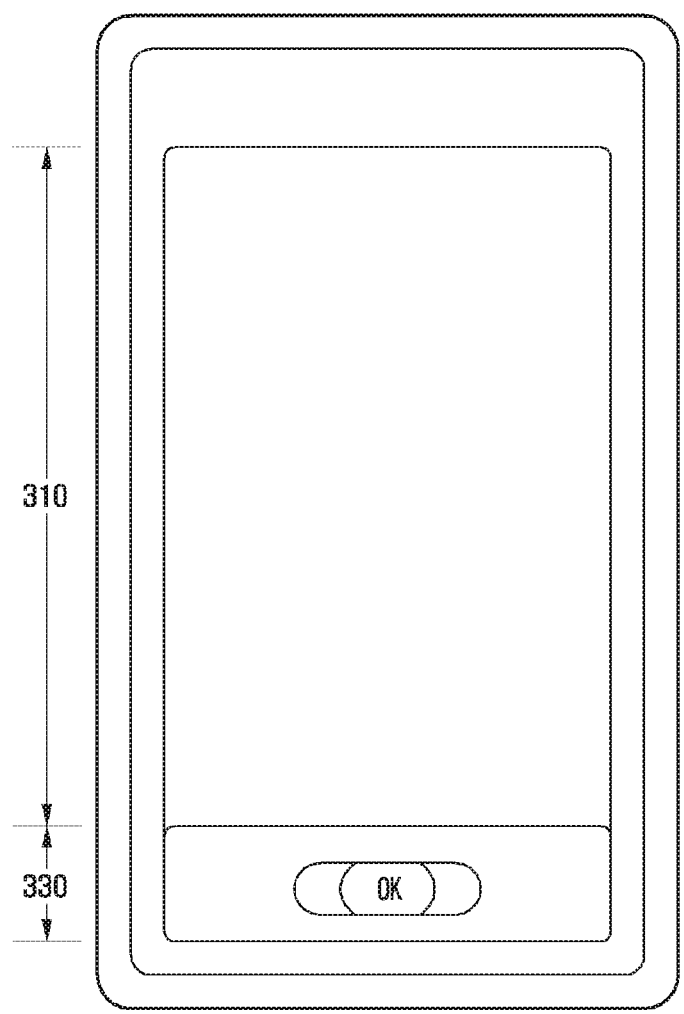
FIGS. 2 to 5 are diagrams schematically illustrating a function control operation in a touch device according to an exemplary embodiment of the present invention.
Figure 3:
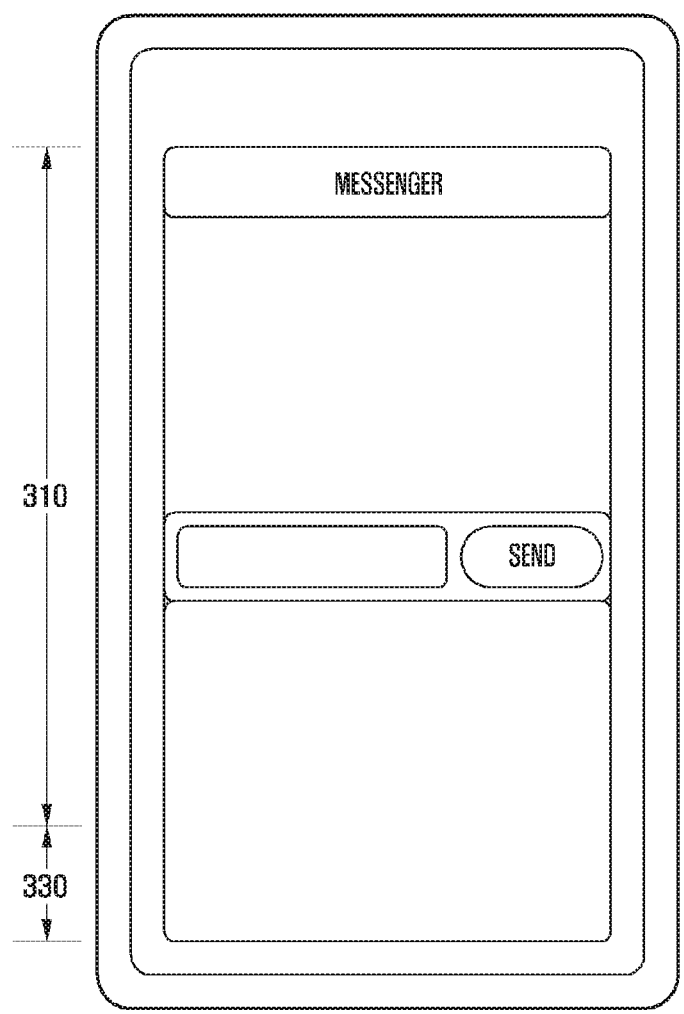
Figure 4:
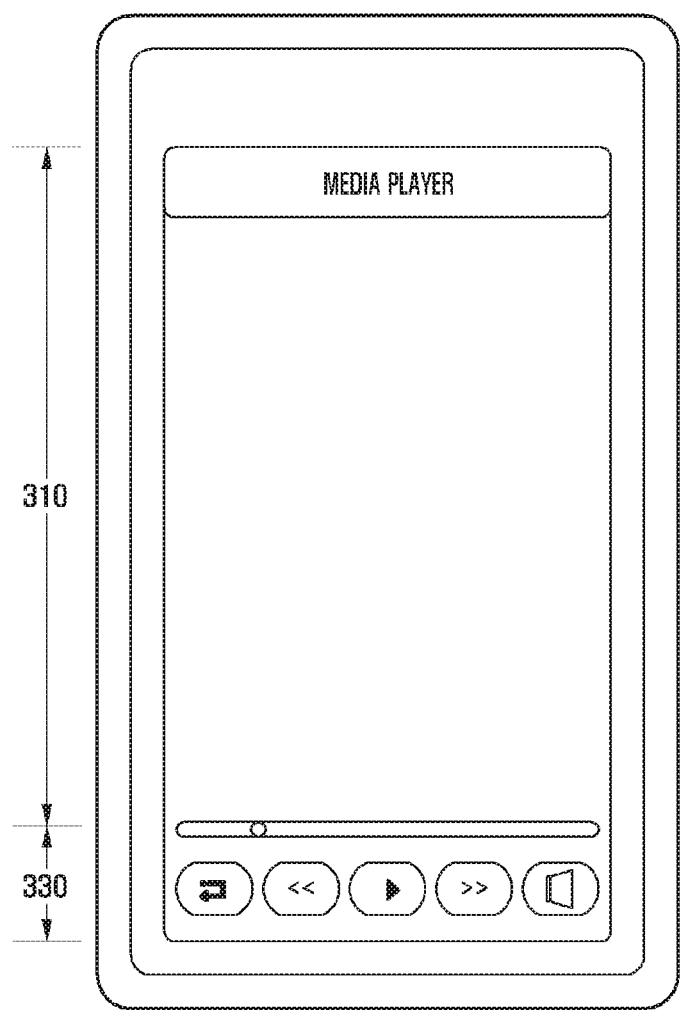
Figure 5:
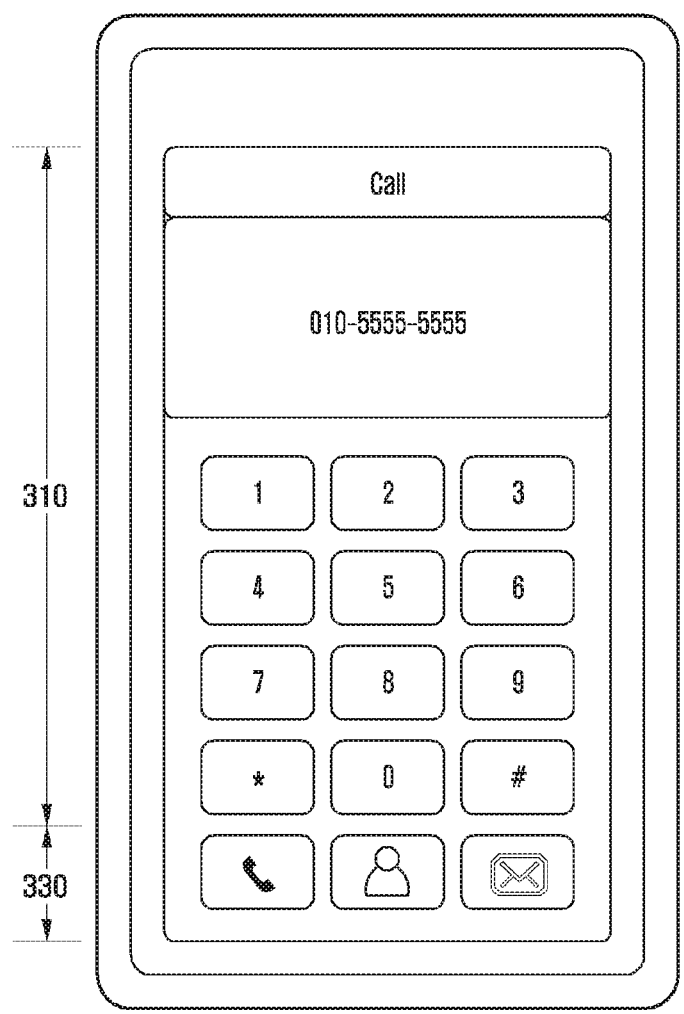

FIG. 2 illustrates an example of a screen when a photographing mode supporting a photographing function of a subject by a camera mode is executed. FIG. 3 illustrates an example of a screen when a messenger mode supporting a chatting function is executed with other users is executed. FIG. 4 illustrates an example of a screen when a media mode supporting a contents playback function such as music, moving images, or mobile broadcasting is executed. FIG. 5 illustrates an example of a screen when a call mode for a voice call or a moving call with another user is executed. According to exemplary embodiments of the present invention, the media mode may be supported by application such as a media player, and may include a music mode for playing music contents, a moving image mode for playing moving images, and a broadcasting mode for playing mobile broadcasting.

Referring to FIGS. 2 to 5, the user interface may be divided into a display region 310 for displaying data according to execution of a function and a function region 330 to which at least one soft type function button for executing a function is provided. The user interface may express a layout differently according to a certain mode, such as the examples illustrated in FIGS. 2 to 5.

An execution screen according to execution of a certain mode such as a photographing mode, a messenger mode, a media mode, and a call mode may be expressed on the display region 310. A screen changed according to variation in an option value due to a touch event of a user using a function button or a result screen of an executed function with a changed option may be variously expressed on the display region 310 in a certain mode.

According to exemplary embodiments of the present invention, at least one soft type function button for executing a function corresponding to a certain mode such as a photographing mode, a messenger mode, a media mode, and a call mode may be expressed on the function region 330. As shown in FIGS. 2 to 5, the function region 330 may be configured by various layouts according to an executed certain mode. A photographing button OK of FIG. 2, a transmission button SEND of FIG. 3, playback function control buttons of FIG. 4, a voice call button, a moving call button, and a message button of FIG. 5 may correspond to the function button. Although not shown in FIGS. 2 to 5, the function button may also be a character input button, a channel switch button, and a recording button.

A form of the user interface is limited to the foregoing form in FIGS. 2 to 5. However, the user interface is divided into a display region 310 and a function region 330 having a function button for controlling a function. It will be appreciated that the user interface may be implemented by user interfaces of various forms such that option change based one touch and function execution may be supported. An operation for option change based one touch and function execution in each mode provided based on the user interface and a screen example thereof is described below.

Figure 6:
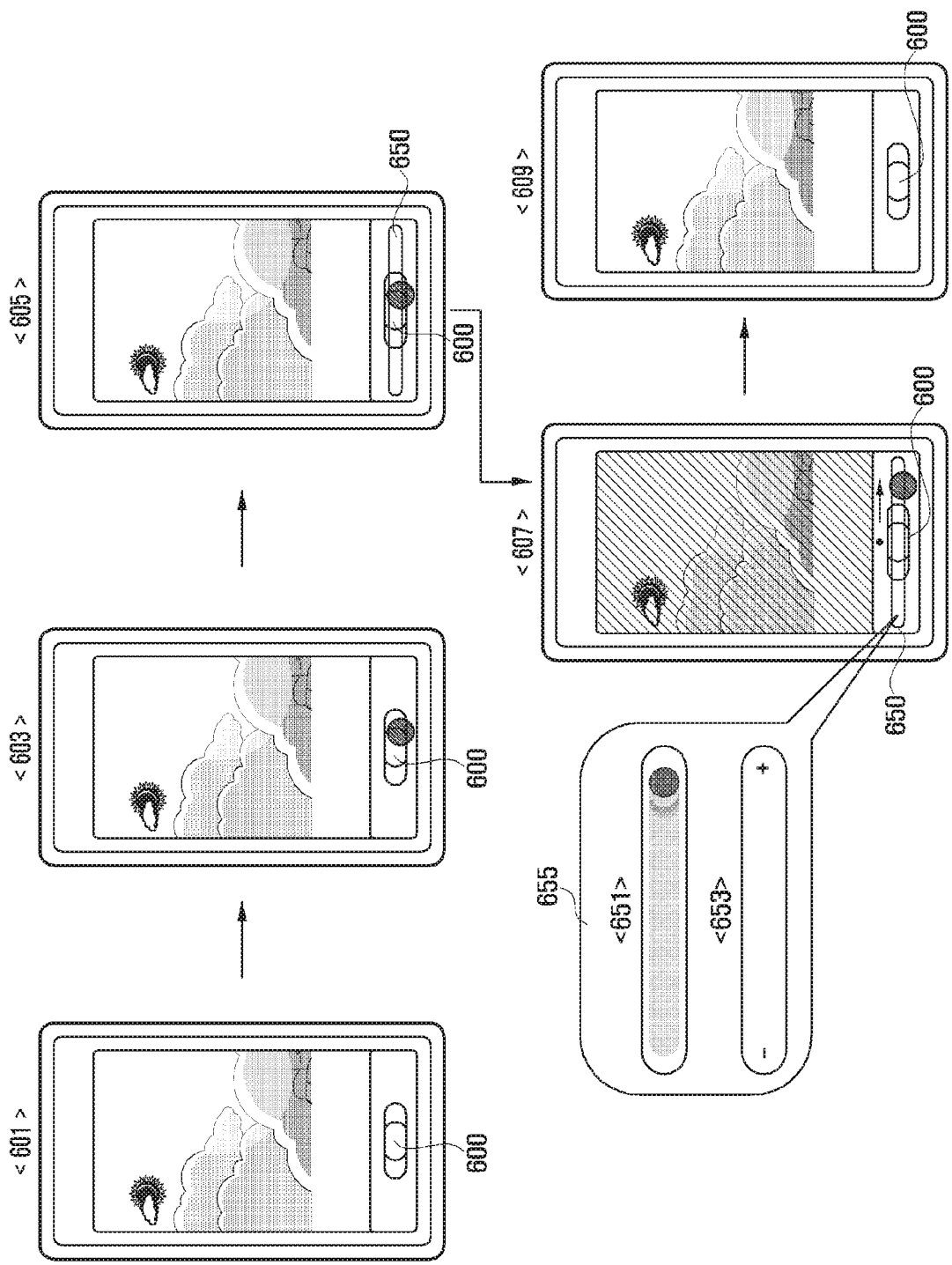
FIGS. 6 to 11 are diagrams illustrating examples of screens for describing an operation of changing an option value and executing a corresponding function using a function button provided by execution modes in a touch device according to an exemplary embodiment of the present invention.

FIG. 6 is diagram illustrating an example of screens for describing an operation of changing an option value and executing a corresponding function using a function button provided by execution modes in a touch device according to an exemplary embodiment of the present invention.

Referring to FIG. 6, FIG. 6 illustrates an example where a photographing mode is executed and a photographing function is performed using a function button (e.g., photographing button) provided in the photographing mode. FIG. 6 illustrates that an option value supported in a photographing mode is changed according to a touch event inputted to the photographing button, and a photographing function is executed based on a changed option value during release of the touch event.

As shown in reference numeral <601>, a photographing mode is executed according to user operation to express a corresponding execution screen. In this case, an image of a subject input through a camera module is displayed on the display region 310 during execution of the photographing mode, and a photographing button 600 for executing a photographing function may be displayed on the function region 330.

The user may input a touch event on a photographing button 600 of a function region 330 as illustrated in reference numeral <603> in a state of reference numeral <601>. When input of a touch event is detected through the photographing button 600, a touch device activates and displays an option menu 650 on the photographing button 600 as illustrated in reference numeral <605>.

When the touch event is input for greater than a preset time, the option menu 650 is activated. If the touch event is released within a preset time, a unique function (e.g., photographing function) allocated to the photographing button 600 may be directly executed. The option menu 650 may be provided on the photographing button 600 in an overlay form, around the photographing button 600 in the function region 330, or at a preset location of the display region 310. A form of the option menu may be determined according to a type of a function button selected in an executed certain mode and a corresponding certain mode, and may be indicated in a certain location according to user setting. An initially provided option menu according to the touch event may be set during manufacture or according to user setting.

For example, the user may designate option menus such as a white balance, brightness, exposure, resolution, ISO as an option menu by the photographing button 600 in a photographing mode, and an output order thereof may be determined and set. If the user selects and designates a white balance menu as an initially activated option menu 650, the option menu 650 illustrated in reference numeral <605> may express a menu for controlling an option value of a white balance. If the user selects and designates an exposure menu as an initially activated option menu 650, the option menu 650 illustrated in reference numeral <605> may express a menu for controlling an option value of an exposure.

Although not shown in FIG. 6, another option menu set to a next order is additionally activated and expressed according to movement of a touch event of the user. For example, when the touch event is moved in a direction (e.g., the touch event is moved toward the display region 310 by a predetermined distance) other than a moving direction for changing the option value, the activated option menu is removed from the screen and a new option menu having a next order according to the movement is activated. A multi-stage option menu may be sequentially activated in a preset order. An operation for sequentially activating an option menu by depths changed according to movement of a touch event is described below.

Here, a previously activated option menu is removed from a screen when a new option menu is activated as described above. However, exemplary embodiments of the present invention are not limited thereto. For example, according to an exemplary embodiment of the present invention, the previously activated option menu may be removed from the screen as described above, or the activated state may be maintained, namely, a display thereof on the screen. In this case, when removing the option menu, a visual effect such as fade out is applied to the expression scheme to remove the option menu. Further, when maintaining the option menu, a visual effect converting the option into a semi-transparent form to display the option menu or a circle remains. When the new option menu is activated, a visual effect such as fade in is applied to display the new option menu.

The user may move the touch event in a certain direction to change an option value according to a given option menu 650 in a state that an option menu 650 is activated as illustrated in reference numeral <605>. For example, as illustrated in reference numeral <607>, the user may move the touch event in a left or right direction on the option menu 650 to change an option value. In this case, the touch device may express a result in which an option value changed according to movement of a touch event is reflected in real time. For example, as illustrated in reference numeral <607>, the user may express a result screen (e.g., an oblique as shown in FIG. 6) corresponding to an option value changed when a touch event is moved in a certain direction to increase/reduce the option value on the given option menu 650. For example, when the user moves the touch event in a direction (e.g., drag interaction) increasing exposure to one level, a screen whose exposure is increased by one level may be provided in real time. Accordingly, the user may determine whether a desired setting is reflected. In addition, movement of a touch event for changing the option value may be achieved by various forms such as a movement in a left or right direction, an upward or downward movement, a movement in a diagonal direction, and rotating movement clockwise or counter-clockwise according to a given type of an option menu.

When an option menu 650 for controlling an exposure option is provided, a form of reference numeral <655> is enlarged and expressed. As illustrated in reference numeral <651>, an expression degree (e.g., color, shadow, etc.) in a region of the option menu 650 may be sequentially and differently expressed according to addition direction of an option. For example, as illustrated in reference numeral <651>, as the option menu 650 goes from a leftmost region to a rightmost region, a shadow may gradually become deeper.

As illustrated in reference numeral <653>, an item (e.g., "−" and "+") indicating that an option is increased or reduced during advancing to a corresponding direction may be provided to respective regions corresponding to a minimum option value and a maximum option value of the option menu 650. For example, as illustrated in reference numeral <653>, a "−" item is expressed on a leftmost region of the option menu 650 and a "+" item is expressed on a rightmost region of the option menu 650. In addition, a scheme in which the option menu 650 is divided into a plurality of regions, and each region includes at least one of an image and a text expressing addition degree or colors of respective divided regions are differently displayed may be used. Accordingly, the user may intuitively recognize a direction for setting an exposure option. An expression scheme of the option menu 650 may be operated in various option menus.

The user may change an option value to a desired option value by an operation as illustrated in reference numeral <607> and then release the input touch event as illustrated in reference numeral <609>. In this case, a released location of the touch event may be released from a moved point to change the option value on the option menu 650. When the touch event is released, the option value may be set to a value corresponding to the point. When release of the input touch event is detected, the touch device may execute a photographing function of the photographing button 600 based on an option value corresponding to a point in which the touch event in the option menu is released and express an execution screen thereof, i.e., a screen photographed as the changed option value.

In the example of FIG. 6, an option menu 650 is activated and displayed while an input touch event is maintained in the photographing button 600 and an option value is changed corresponding to movement in a direction for changing the maintained touch event to an option value. When the touch event is released, a photographing function of the photographing button 600 may be executed according to the changed option value.

When a touch event is input to the photographing button 600 in a photographing mode and the touch event is released, a photographing function may be executed. Further, when a touch event is input and maintained to a photographing button 600 in the photographing mode, an option menu 650 may be activated and displayed, and an option according to a given option menu 650 may be set. When the touch event is subsequently released, a photographing function may be executed based on a preset option value.

Figure 7:
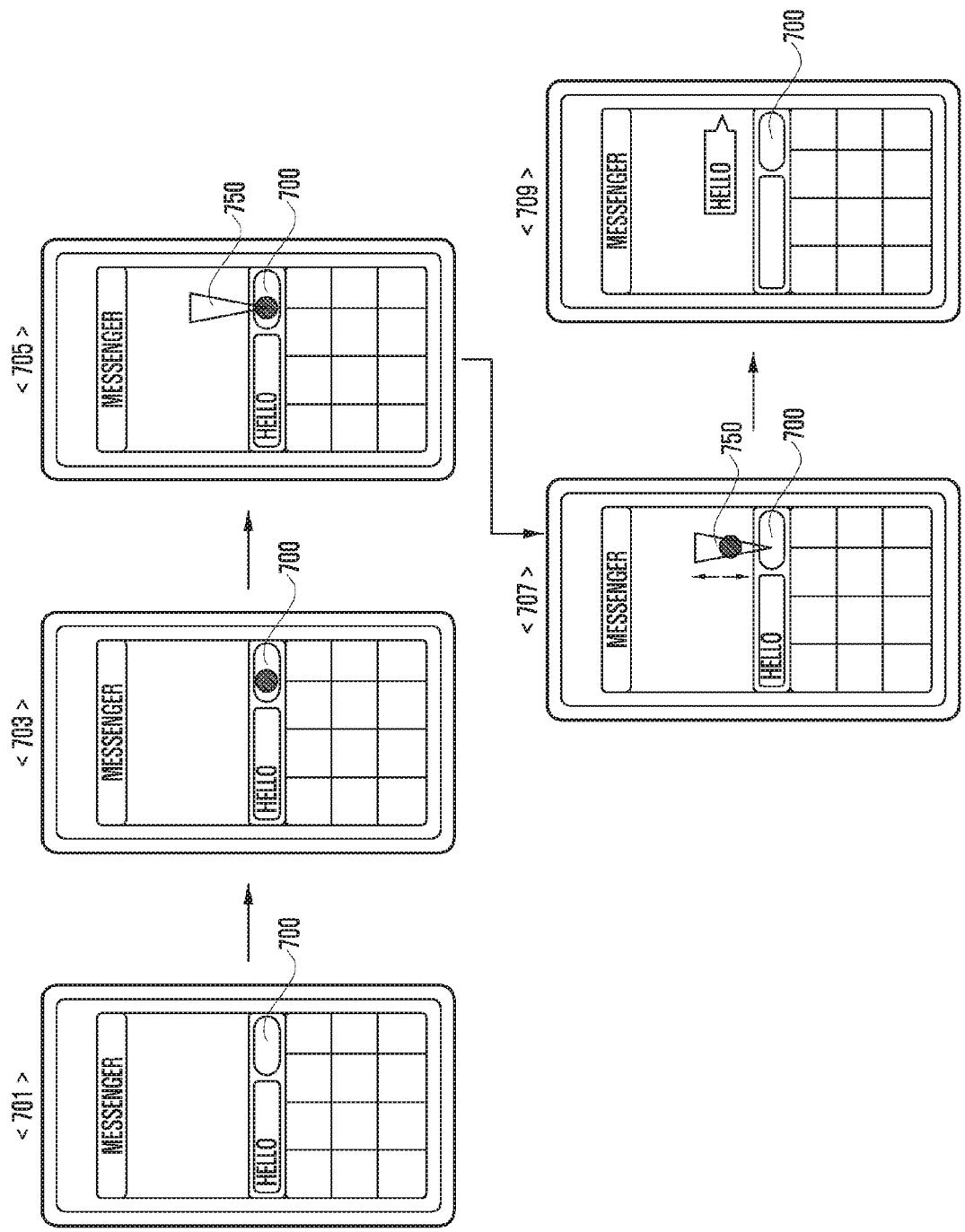

FIG. 7 is a diagram illustrating an example of screens for describing an operation of changing an option value and executing a corresponding function using a function button provided by execution modes in a touch device according to an exemplary embodiment of the present invention.

Referring to FIG. 7, FIG. 7 illustrates an example where a messenger mode is executed and a chatting function is performed using a function button (e.g., transmission button, character input button) provided in the messenger mode. FIG. 7 illustrates an operation for changing an option value supported in a messenger mode according to an input touch event and for executing a text transmission according to a chatting function based on a changed option value.

As illustrated in reference numeral <701>, a messenger mode is executed according to user operation and a corresponding execution screen is indicated. In this case, during execution of the messenger mode, text (including item such as emoticon) transmitted/received according to execution of a chatting function of the user is displayed on the display region 310, and a character input button and a transmission button 700 for performing a chatting function may be displayed on the function region 330. FIG. 7 illustrates an example of using the transmission button 700. In FIG. 7, a user inputs a character "HELLO" using a character input button and transmission thereof is in a stand-by state.

The user may input a touch event on a transmission button 700 of the function region 330 as illustrated in reference numeral <703> in a state of the reference numeral <701>. When input of the touch event is detected through a transmission button 700, the touch device may activate and express an option menu 750 on the transmission button 700 as illustrated in reference numeral <705>.

When the touch event is input for greater than a preset time, the option menu 750 is activated. If the touch event is released within a preset time, an unique function (e.g., input text transmission function) allocated to the transmission button 700 may directly executed. The option menu 750 may be provided on the photographing button 700 in an overlay form, around the transmission button 700 in the function region 330, or at a preset location of the display region 310. A providing form of the option menu may be determined according to a type of a function button selected in a certain executed mode and a corresponding certain mode, and may be indicated in a certain location according to user setting. An option menu initially provided according to the touch event may be set during manufacture or according to user setting.

For example, the user may designate option menus such as font type, font size, font color, language as an option menu by the transmission button in the messenger mode, and determine and set an output order thereof. When the user selects and designates a font size menu as an option menu 750, an option menu 750 illustrated in reference numeral <705> may include a menu for controlling an option value of font size. When the user selects and designates a font color menu as an initially activated option menu 750, an option menu 750 illustrated in reference numeral <705> may include a menu for controlling an option value of a font color.

Although not shown in FIG. 7, another option menu set in a next order may be additionally activated and expressed according to movement of a touch event of the user. For example, when the user moves the touch event in a direction (e.g., movement of a touch event in a display region 310 side by a predetermined distance) other than a moving direction for changing the option value, the activated option menu maintains or is removed from the screen according to a preset scheme, and a new option menu having a next order is activated and expressed according to the movement. A multi-stage option menu may be sequentially activated in a preset order. An operation for sequentially activating an option menu by depths changed according to movement of a touch event is described below. Here, the option menu is removed from the screen by applying a visual effect in which an option menu gradually disappears such as fade out. When the option menu remains on the screen, the option menu may be converted into a semi-transparent form or be expressed to have a circle. When the new option menu is activated, the new option menu may be expressed by applying a visual effect in which an option menu gradually disappears such as fade in.

The user may move the touch event in a certain direction to change an option value according to a given option menu 750 in a state that the option menu 750 is activated as illustrated in reference numeral <705>. As illustrated in reference numeral <707>, the user moves the touch event upward or downward on the option menu 750 to change an option value. In this case, the touch device may express a result in real time in which an option value changed according to movement of a touch event is reflected. The user may express a result screen corresponding to an option value changed when a touch event is moved to a certain direction to increase/reduce an option value on the given option menu 750. For example, when the user moves the touch event (for example, drag interaction) in a direction which a font size is increased by one level, a screen whose font size of an input text "HELLO" is increased by one level may be provided in real time. Accordingly, the user may directly confirm whether the desired setting is displayed. Movement of a touch event for changing the option value may be achieved by various forms such as a movement in a left or right direction, an upward and downward movement, a movement in a diagonal direction, and rotating movement clockwise or counter-clockwise according to a given type of an option menu.

The user may change the option value to a desired option value by the operation illustrated in reference numeral <707> and then release the input touch event as illustrated in reference numeral <709>. In this case, the touch event may be released in a moved point to change an option value on the option menu 750. When the touch event is released, the option value may be set to a value corresponding to the point. Accordingly, when release of the input touch event is detected, the touch device may execute a text transmission function of the transmission button 700 based on an option value corresponding to a released point of the touch event on the option menu 750 and express an execution screen thereof, i.e., a screen to which a text reflecting a changed option value is transmitted.

In the example of FIG. 7, an option menu 750 is activated and indicated while an input touch event is maintained in the transmission button 700 and an option value is changed corresponding to movement in a direction for changing the maintained touch event to an option value. When the touch event is released, a transmission function of the transmission button 700 may be executed with the changed option value.

As described above, when a touch event is input to the transmission button 700 in a messenger mode and the touch event is released, a transmission function of an input text may be executed. When a touch event is input and maintained to the transmission button 700, an option menu 750 is activated and displayed, and an option is set according to a given option menu 750, When the touch event is released, a text transmission function may be executed based on a preset option value.

Figure 8:
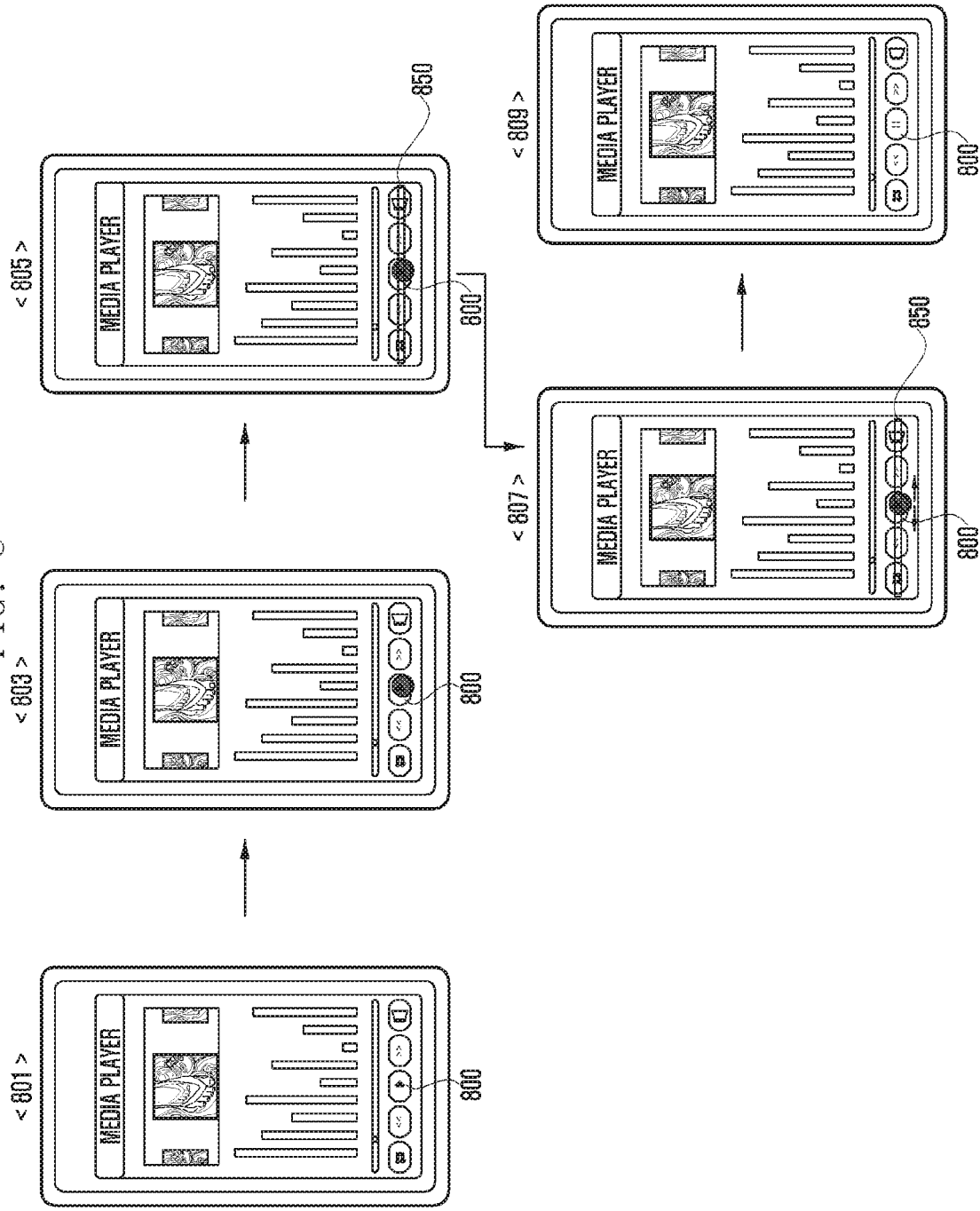

FIG. 8 is a diagram illustrating an example of screens for describing an operation of changing an option value and executing a corresponding function using a function button provided by execution modes in a touch device according to an exemplary embodiment of the present invention.

Referring to FIG. 8, FIG. 8 illustrates an example where a media mode (e.g., music mode) is executed, and a music playback function is performed using a function button (e.g., a control button associated with music playback function control, such as a playback button, a Fast Forward (FF) button, a rewind (REW), a volume control button, and/or a section repetition button). FIG. 8 illustrates an operation of changing an option value provided in a media mode according to a touch event inputted to a playback button and controlling a playback speed according to a music playback function based on a changed option value during release of the touch event.

As shown in reference numeral <801>, a media mode is executed according to user operation to express a corresponding execution screen. In this case, music file information and a music skin according to user selection is indicated on the display region 310 during execution of the media mode, and various control buttons for executing the music playback function may be indicated. FIG. 8 illustrates an example of using a playback button 800.

In a state of reference numeral <801>, a touch event may be input on a playback button 800 of a function region 330 as illustrated in reference numeral <803>. When input of the touch event is detected through a playback button 800, the touch device may activate and indicate the option menu 850 on the playback button 800 as illustrated in reference numeral <805>.

When the touch event is input for greater than preset time, the option menu 850 is activated. If the touch event is released within a preset time, a unique function (e.g., music playback function) allocated to the playback button 800 may be executed. The option menu 850 may be provided on the playback button 800 in an overlay form, around the playback button 800 in the function region 330, or at a preset location of the display region 310. A providing form of the option menu may be determined according to a type of a function button selected in an executed certain mode and a corresponding certain mode, and may be indicated in a certain location according to user setting. An option menu initially provided according to the touch event may be set during manufacture or according to user setting.

For example, the user may designate option menus for playback such as file list, music skin, audio effect, section repetition playback, sound field, playback color temperature, playback speed, and may determine and set an output order thereof. When the user selects and designates a playback speed menu as an initially activated option menu 850, an option menu 850 indicated in the reference numeral <805> may be indicated as a menu for controlling an option value of playback speed. When the user selects and designates a file list as the initially activated option menu 850, the option menu 850 illustrated in reference numeral <805> may become a list menu for selecting a file to be played.

Although not shown in FIG. 8, another option menu set in a next order may be additionally activated and expressed according to movement of a touch event of the user. For example, when the user moves the touch event in a direction (e.g., movement of a touch event in a display region 310 side by a predetermined distance) other than a moving direction for changing the option value, the activated option menu is maintained or is removed from the screen according to a preset scheme, and a new option menu having a next order is activated and expressed according to the movement. A multi-stage option menu may be sequentially activated in a preset order. An operation for sequentially activating an option menu by depths changed according to movement of a touch event is described below. The option menu is removed from the screen by applying a visual effect in which an option menu gradually disappears such as fade out. When the option menu remains on the screen, the option menu may be converted into a semi-transparency form or be expressed to have a circle as it is. When the new option menu is activated, the new option menu may be expressed by applying a visual effect in which an option menu gradually disappears such as fade in.

The user may move the touch event to a certain direction to change an option value according to a given option menu 850 in a state that an option menu 850 is activated as illustrated in reference numeral <805>. For example, as illustrated in reference numeral <807>, the user may move the touch event in a left or right direction on the option menu 850 to change an option value. In this case, the touch device may express a result in which an option value changed according to movement of a touch event is reflected in real time. For example, as illustrated in reference numeral <807>, the user may express a result screen corresponding to an option value changed when a touch event is moved to a certain to increase/reduce the option value on the given option menu 850.

For example, when the given option menu 850 is an option menu for increasing/reducing playback speed, and the user moves the touch event in a direction (e.g., drag interaction) increasing the playback to one level on the option menu 850, relation information indicating that the playback speed is changed (e.g., increased) may be provided in real time. When the given option menu 850 is an option menu for changing music skin, and the user moves the touch event (e.g., drag interaction) in a direction changing the music skin on the option menu 850, a screen in which the music skin is changed may be provided in real time. When the given option menu 850 is an option menu for setting section playback, and the user moves the touch event (e.g., drag interaction) by a desired section for section playback on the option menu to set a playback period (playback length), relation information indicating that the playback period (or length) is set from a current playback time point (or playback start time point) to a moved section of the touch event may be provided through a screen in real time.

Accordingly, the user may determine whether a desired setting is reflected. Movement of a touch event for changing the option value may be achieved by various forms such as a movement in a left or right direction, an upward and downward movement, a movement in a diagonal direction, and rotating movement clockwise or counter-clockwise according to a given type of an option menu.

The user may change an option value to a desired option value by an operation as illustrated in reference numeral <807> and then release the input touch event as illustrated in reference numeral <809>. In this case, a released location of the touch event may be released from a moved point to change the option value on the option menu 850. When the touch event is released, the option value may be set to a value corresponding to the point. When release of the input touch event is detected, the touch device may execute a music playback function of the playback button 800 based on an option value corresponding to a point in which the touch event in the option menu 850 is released and express an execution screen thereof. For example, a screen photographed as the changed option value may be expressed. In a case of controlling a function associated with sound output among the music playback functions, the sound output may be changed and output according to a changed option value. For example, sound output matching variation in playback speed may be output at high or low tempo. Further, section playback may be achieved from a current playback time point (or playback start time point) to a time period (or length) designated by the user.

In the example of FIG. 8, an option menu 850 is activated and indicated while an input touch event maintains in the playback button 800 and an option value is changed corresponding to movement in a direction for changing the maintained touch event to an option value. When the touch event is released, a music playback function of the playback button 800 may be executed with the changed option value.

As described above, when a touch event is input to the playback button 800 in a media mode and subsequently released, a music playback function may be executed. When the touch event is input to a playback button 800 in a media mode and maintained, the option menu 850 may be activated and maintained, and an option may be set according to a given option menu 850. When the touch event is released, a music playback function may be executed based on a preset option value.

Figure 9:
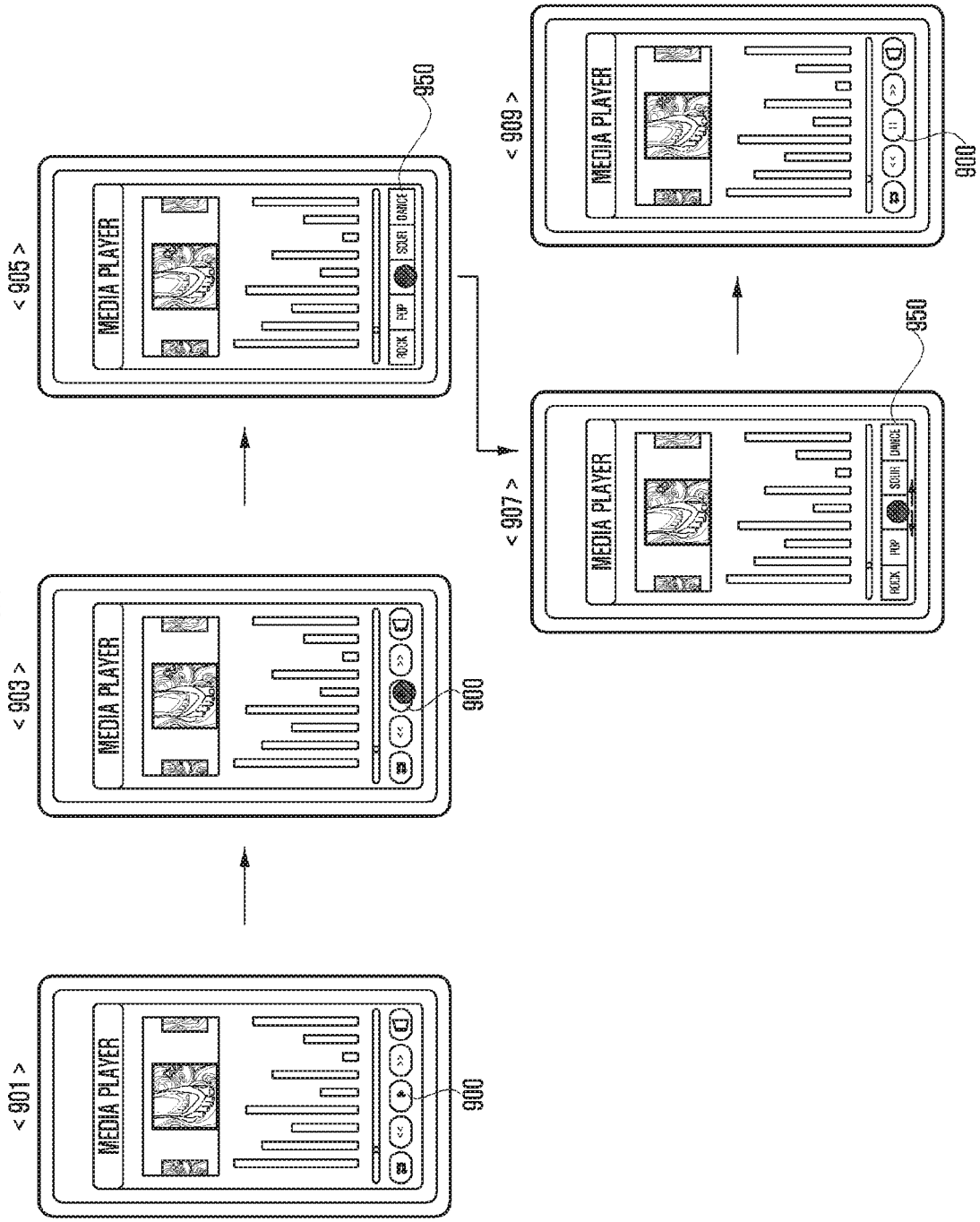

FIG. 9 is a diagram illustrating an example of screens for describing an operation of changing an option value and executing a corresponding function using a function button provided by execution modes in a touch device according to an exemplary embodiment of the present invention.

Referring to FIG. 9, FIG. 9 illustrates an operation similar to that of FIG. 8, which a case where a provided option menu is different. For example, FIG. 8 may illustrate an example where a bar type option menu 850 for controlling a playback speed option value, whereas FIG. 9 may illustrate an example where a menu type option menu 950 for controlling an audio effect option value. Further, an example of operating various option menus provided in the same certain mode is described below.

FIG. 9 illustrates an example where a media mode (e.g., music mode) is executed and of performing a music playback function using a control button associated with music playback function control). FIG. 9 illustrates an operation of changing an option value supported in a media mode according to a touch event input to a playback button and controlling playback speed according to a music playback function based on an option value changed during release of the touch event.

As illustrated in reference numeral <901>, a media mode is executed according to user operation and a corresponding execution screen is indicated. During execution of the media mode, music file information and a music skin according to user selection may be indicated on the display region 310 and various control buttons for executing a music playback function may be displayed on the function region 330. FIG. 9 illustrates a case of using a playback button 900.

The user may input a touch event on a playback button 900 of the function region 330 as illustrated in reference numeral <903> in a state of reference numeral <901>. When input of the touch event is detected through a playback button 900, the touch device may activate and indicate an option menu 950 on the playback button 900 as illustrated in reference numeral <905>.

When the touch event is input for greater than a preset time, the option menu 950 is activated. If the touch event is released within a preset time, a unique function (e.g., music playback function) allocated to the playback button 900 may be executed. The option menu 950 may be provided on the playback button 900 in an overlay form, around the playback button 900 in the function region 330, or at a preset location of the display region 310. A providing form of the option menu may be determined according to a type of a function button selected in an executed certain mode and a corresponding certain mode, and may be indicated in a certain location according to user setting. An initially provided option menu according to the touch event may be set during manufacture or according to user setting.

For example, the user may designate option menus necessary for playback such as a file list, a music skin, an audio effect, section repetition playback, a sound field, a playback color temperature, and playback speed as an option menu by the playback button 950 in a media mode, and an output order thereof may be determined and set. If the user selects and designates a playback speed menu as an initially activated option menu 950, the option menu 950 illustrated in reference numeral <905> may express a menu for controlling an option value of playback speed.

Although not shown in FIG. 9, another option menu set in a next order may be additionally activated and expressed according to movement of a touch event of the user. For example, when the user moves the touch event in a direction (e.g., movement of a touch event in a display region 310 side by a predetermined distance) other than a moving direction for changing the option value, the activated option menu is maintained or is removed from the screen according to a preset scheme, and a new option menu having a next order is activated and expressed according to the movement. A multi-stage option menu may be sequentially activated in a preset order. An operation for sequentially activating an option menu by depths changed according to movement of a touch event is described below.

The option menu is removed from the screen by applying a visual effect in which an option menu gradually disappears such as fade out. When the option menu remains on the screen, the option screen may be converted into a semi-transparent form or be expressed to have a circle. When the new option menu is activated, the new option menu may be expressed by applying a visual effect in which the new option menu gradually disappears such as fade in.

The user may move the touch event in a certain direction to change an option value according to a given option menu 950 in a state that the option menu 950 is activated as illustrated in reference numeral <905>. For example, as illustrated in reference numeral <907>, the user moves the touch event upward or downward on the option menu 950 to change an option value. In this case, the touch device may express a result in which an option value changed according to movement of a touch event is reflected. For example, as illustrated in reference numeral <907>, the user may express a result screen corresponding to an option value changed when a touch event is moved to a certain direction to increase/reduce an option value on the given option menu 950. For example, when the user moves the touch event (for example, drag interaction) in a direction which a certain audio effect is changed, a screen for informing variation state as a corresponding audio effect part according to user selection is highlighted may be provided in real time. Movement of a touch event for changing the option value may be achieved by various forms such as a movement in a left or right direction, an upward and downward movement, a movement in a diagonal direction, and rotating movement clockwise or counter-clockwise according to a given type of an option menu.

The user may change the option value to a desired option value by the operation illustrated in reference numeral <907> and then release the input touch event as illustrated in reference numeral <909>. The touch event may be released in a moved point to change an option value on the option menu 950. When the touch event is released, the option value may be set to a value corresponding to the point. Accordingly, when release of the input touch event is detected, the touch device may execute a playback function of the playback button 900 based on an option value corresponding to a released point of the touch event on the option menu 950 and express an execution screen thereof. For example, information indicating that the audio is played by an audio effect (e.g., POP) reflecting a changed option value may be provided through a screen, and a sound may be output suited to a corresponding audio effect (e.g., POP).

In the example of FIG. 9, an option menu 950 is activated and indicated while an input touch event maintains in the playback button 900 and an option value is changed corresponding to movement in a direction for changing the maintained touch event to an option value. When the touch event is released, a music playback function being an unique function of the playback button 900 may be executed with the changed option value.

When the present invention a touch event is input to the playback button 900 in a media mode and the touch event is subsequently released, a music playback function may be executed. When a touch event is input to a playback button 900 in a media mode and maintained, an option menu 950 may be activated and displayed by the touch event, and an option may be set according to a given option menu 950.

When the touch event is released, a music playback function may be executed based on the set option value.

Figure 10:
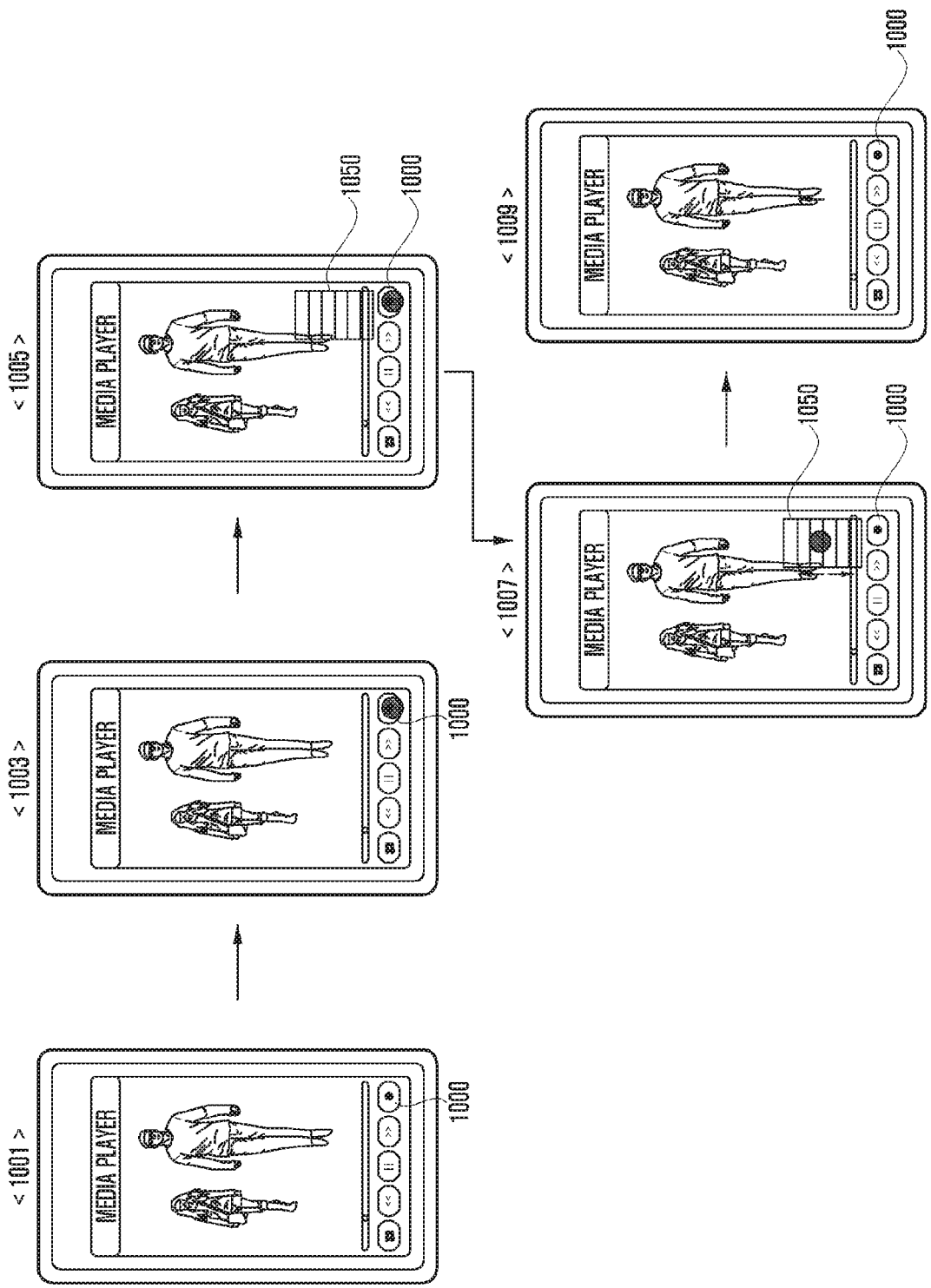

FIG. 10 is a diagram illustrating an example of screens for describing an operation of changing an option value and executing a corresponding function using a function button provided by execution modes in a touch device according to an exemplary embodiment of the present invention.

Referring to FIG. 10, FIG. 10 illustrates an example where a media mode (e.g., broadcast mode, moving image mode) is executed and a mobile broadcasting playback function is performed using a control button associated with music playback function control. FIG. 10 illustrates an operation of changing an option value supported in a media mode according to a touch event input to a recording button and controlling playback speed according to a mobile broadcasting playback function based on an option value changed during release of the touch event.

Referring to FIG. 10, as illustrated in reference numeral <1001>, a media mode is executed according to user operation and a corresponding execution screen is indicated. During execution of the media mode, a corresponding image of a mobile broadcasting channel according to user selection may be indicated on the display region 310 and various control buttons (e.g., playback button, channel switch button, section repetition button, recording button, etc.) for executing a music playback function may be indicated on the function region 330. FIG. 10 illustrates a case of using a recording button 1000.

The user may input a touch event on a recording button 1000 of the function region 330 as illustrated in reference numeral <1003> in a state of reference numeral <1001>. When input of the touch event is detected through a recording button 1000, the touch device may activate and indicate an option menu 1050 on the recording button 1000 as illustrated in reference numeral <1005>.

When the touch event is input for greater than a preset time, the option menu 1050 is activated. If the touch event is released within a preset time, a unique function (e.g., recording function) allocated to the recording button 1000 may be directly executed. The option menu 1050 may be provided on the recording button 1000 in an overlay form, around the recording button 1000 in the function region 330, or at a preset location of the display region 310. A providing form of the option menu may be determined according to a type of a function button selected in an executed certain mode and a corresponding certain mode, and may be indicated in a certain location according to user setting. An option menu initially provided according to the touch event may be set during manufacture or by user setting.

For example, the user may designate option menus necessary for playback such as a file list, a music skin, an audio effect, section repetition playback, a sound field, a playback color temperature, and playback speed as an option menu by the button 600 in a media mode, and an output order thereof may be determined and set. If the user selects and designates a recording menu as an initially activated option menu 1050, the option menu 1050 illustrated in reference numeral <1005> may express a menu for controlling an option value of a recording time. When the user selects and designates a channel list as an initially activated option menu 1050, the option menu 1050 illustrated in reference numeral <1005> may express a list menu for selecting channel broadcasting to be recorded.

Although not shown in FIG. 10, another option menu set in a next order may be additionally activated and expressed according to movement of a touch event of the user. For example, when the user moves the touch event in a direction (e.g., movement of a touch event in the display region 310 side by a predetermined distance) other than a moving direction for changing the option value, the activated option menu is maintained or is removed from the screen according to a preset scheme, and a new option menu having a next order is activated and expressed according to the movement. A multi-stage option menu may be sequentially activated in a preset order. An operation for sequentially activating an option menu by depths changed according to movement of a touch event is described below.

The option menu is removed from the screen by applying a visual effect in which an option menu gradually disappears such as fade out. When the option menu remains on the screen, the option menu may be converted into a semi-transparency form or be expressed to have a circle. When the new option menu is activated, the new option menu may be expressed by applying a visual effect in which an option menu gradually disappears such as fade in.

The user may move the touch event in a certain direction to change an option value according to a given option menu 1050 in a state that the option menu 1050 is activated as illustrated in reference numeral <1005>. For example, as illustrated in reference numeral <1007>, the user moves the touch event upward or downward on the option menu 1050 to change an option value. The touch device may express a result in real time in which an option value changed according to movement of a touch event is reflected. For example, as illustrated in reference numeral <1007>, the user may express a result screen corresponding to an option value changed when a touch event is moved to a certain direction to increase/reduce an option value on the given option menu 1050. When the user moves the touch event (for example, drag interaction) in a direction for setting a recording time, relation information indicating a recording time to be selected may be provided through a screen in real time. Similarly, when the user moves the touch event in a direction of a channel to be recorded (e.g., drag interaction), relation information indicating a selected channel may be provided through a screen. Accordingly, the user may confirm whether the desired setting is reflected. Movement of a touch event for changing the option value may be achieved by various forms such as a movement in a left or right direction, an upward and downward movement, a movement in a diagonal direction, and rotating movement clockwise or counter-clockwise according to a given type of an option menu.

The user may change the option value to a desired option value by the operation illustrated in reference numeral <1007> and then release the input touch event as illustrated in reference numeral <1009>. The touch event may be released in a moved point to change an option value on the option menu 1050. When the touch event is released, the option value may be set to a value corresponding to the point. Accordingly, when release of the input touch event is detected, the touch device may execute a text transmission function of a recording button 1000 based on an option value corresponding to a released point of the touch event on the option menu 1050 and express an execution screen thereof. When the user sets a recording time using the recording button and then executes the recording function, recording information or expected recording information may be displayed on a screen according to a changed option value (recording time).

In the example of FIG. 10, an option menu 1050 is activated and indicated while an input touch event is maintained in the recording button 1000 and an option value is changed corresponding to movement in a direction for changing the maintained touch event to an option value. When the touch event is released, a music playback function of the recording button 1000 may be executed with the changed option value.

When a touch event is input to the recording button 1000 and the touch event is released, a recording function may be executed. When a touch event to a recording button 1000 is input in a media mode and maintained, an option menu 1050 is activated and displayed by the touch event, and an option is set according to a given option menu 1050. When the touch event is released, the recording function may be executed based on the set option value.

Figure 11:
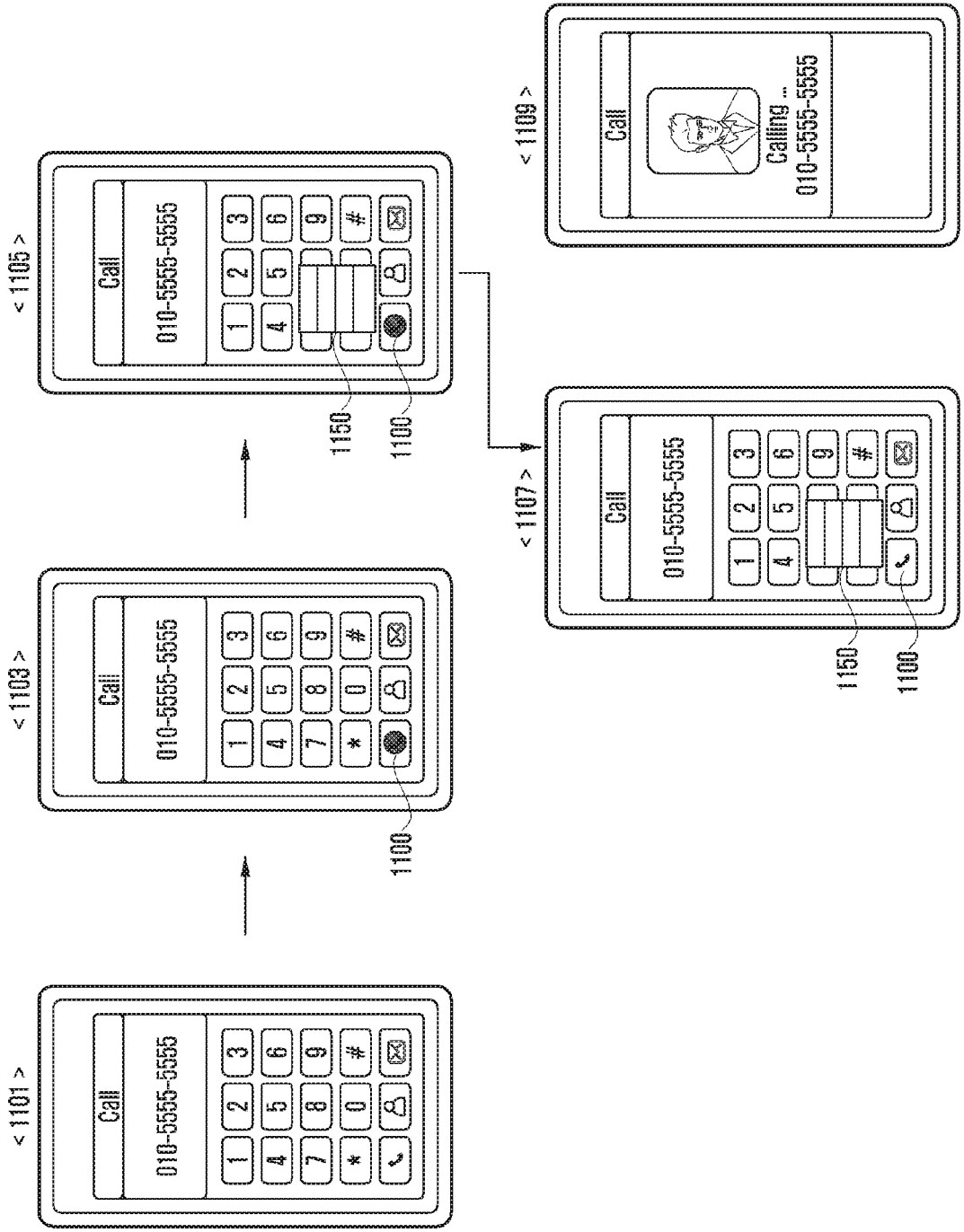

FIG. 11 is a diagram illustrating an example of screens for describing an operation of changing an option value and executing a corresponding function using a function button provided by execution modes in a touch device according to an exemplary embodiment of the present invention.

Referring to FIG. 11, FIG. 11 illustrates an example where a media mode is executed and a call function is performed using a function button (e.g., voice call button, moving call button, message button, character input button, etc.) provided in the call mode. FIG. 11 illustrates an operation of changing an option value supported in a call mode according to a touch event input to a voice call button and executing call transmission according to the call function based on an option value changed during release of the touch event.

As illustrated in reference numeral <1101>, a call mode is executed according to user operation and a corresponding execution screen is indicated. During execution of the call mode, receiver information (e.g., phone number) input by the user may be indicated on a display region 310 and a voice call button, a moving call button, a message button, and a character input button for executing a call function may be indicated on the function region 330. FIG. 11 illustrates a case of using a voice call button 1100 in which a user inputs receiver information of "010-5555-5555" using a character input button and call transmission is in a stand-by state.

The user may input a touch event on a recording button 1100 of a function region 330 as illustrated in reference numeral <1003> in a state of reference numeral <1101>. When input of the touch event is detected through a voice call button 1100, the touch device may activate and indicate an option menu 1150 on the voice call button 1100 as illustrated in reference numeral <1105>.

When the touch event is input for greater than a preset time, the option menu 1150 is activated. If the touch event is released within a preset time, a unique function (e.g., recording function) allocated to the voice call button 1100 may be directly executed. The option menu 1150 may be provided on the voice call button 1100 in an overlay form, around the voice call button 1100 in the function region 330, or at a preset location of the display region 310. A providing form of the option menu may be determined according to a type of a function button selected in an executed certain mode and a corresponding certain mode, and may be indicated in a certain location according to user setting. An option menu initially provided according to the touch event may be set during manufacture or by user setting.

For example, the user may designate an option menu such as a Key pad, End Call, Speaker, Mute, Replace Picture (allocated to a moving call button) as an option menu by the voice call button 1100 in the call mode. An option menu 1150 indicated in reference numeral <1105> may include a menu capable of selecting an option value such as Key pad, End Call, Speaker, and Mute.

Although not shown in FIG. 11, another option menu set in a next order may be additionally activated and expressed according to movement of a touch event of the user. For example, when the user moves the touch event in a direction (e.g., movement of a touch event in a display region 310 side by a predetermined distance) other than a moving direction for changing the option value, the activated option menu is maintained or is removed from the screen according to a preset scheme, and a new option menu having a next order is activated and expressed according to the movement. A multi-stage option menu of multi-stages may be sequentially activated in a preset order. An operation for sequentially activating an option menu by depths changed according to movement of a touch event is described below.

The option menu is removed from the screen by applying a visual effect in which an option menu gradually disappears such as fade out. When the option menu remains on the screen, the option menu may be converted into a semi-transparency form or be expressed to have a circle. When the new option menu is activated, the new option menu may be expressed by applying a visual effect in which an option menu gradually disappears such as fade in.

The user may move the touch event in a certain direction to change an option value according to a given option menu 1150 in a state that the option menu 1150 is activated as illustrated in reference numeral <1105>. As illustrated in reference numeral <1107>, the user moves the touch event upward or downward on the option menu 1150 to change an option value. The touch device may express a result in which an option value changed according to movement of a touch event is reflected. As illustrated in reference numeral <1107>, the user may express a result screen corresponding to an option value changed when a touch event is moved to a certain direction to increase/reduce an option value on the given option menu 1150. For example, when the user moves the touch event (for example, drag interaction) in a direction for setting a recording time, relation information indicating a recording time to be selected may be provided through a screen in real time. Similarly, when the user moves the touch event in a direction of a channel to be recorded (e.g., drag interaction), relation information indicating a selected channel may be provided through a screen. Accordingly, the user may confirm whether desired setting is reflected. Movement of a touch event for changing the option value may be achieved by various forms such as a movement in a left or right direction, an upward and downward movement, a movement in a diagonal direction, and rotating movement clockwise or counter-clockwise according to a given type of an option menu.

The user may change the option value to a desired option value by the operation illustrated in reference numeral <1107> and then release the input touch event as illustrated in reference numeral <1109>. The touch event may be released in a moved point to change an option value on the option menu 1150. When the touch event is released, the option value may be set to a value corresponding to the point. Accordingly, when release of the input touch event is detected, the touch device may execute a text transmission function being a unique function of a voice call button 1100 based on an option value corresponding to a released point of the touch event on the option menu 1150 and express an execution screen thereof. In the example of FIG. 11, a screen on which call transmission is achieved with a changed option value is displayed.

In the example of FIG. 11, an option menu 1150 is activated and indicated while an input touch event is maintained in the voice call button 1100 and an option value is changed corresponding to movement in a direction for changing the maintained touch event to an option value. When the touch event is released, a call function of the voice call button 1100 may be executed with the changed option value.

When a touch event is input to the voice call button 1100 in a call mode and the touch event is released, a call transmission function may be executed. When a touch event to a voice call button 1100 is input and maintained in a call mode, an option menu 1150 is activated and displayed by the touch event, and an option is set according to a given option menu 1150. When the touch event is released, the call transmission function may be executed based on the set option value.

Figure 12:
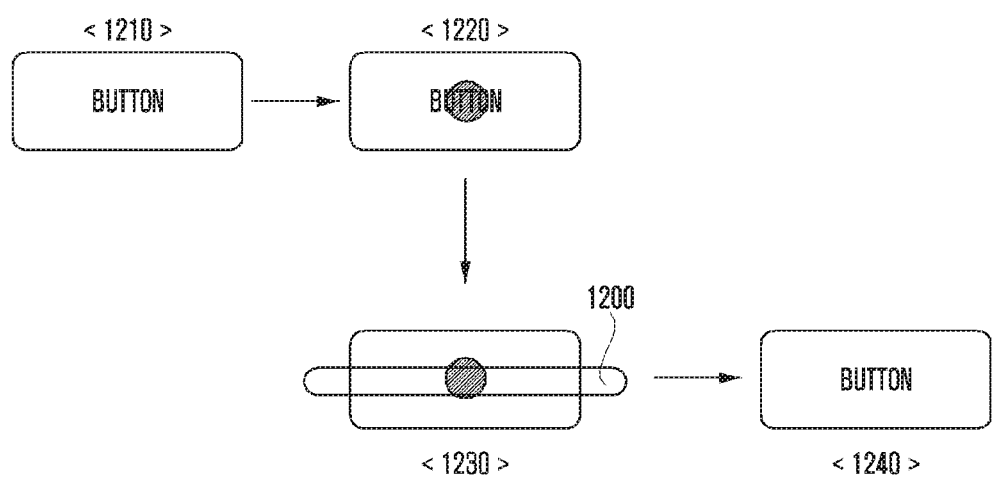
FIG. 12 is a diagram illustrating an operation of changing an option and executing a function in a touch device according to an exemplary embodiment of the present invention.

FIG. 12 is a diagram illustrating an operation of changing an option and executing a function in a touch device according to an exemplary embodiment of the present invention.

Referring to FIG. 12, as illustrated in reference numeral <1210>, a certain function button supportable in a certain mode may be provided through the function region 330. The user may input a touch event on the function button as illustrated in reference numeral <1220>.

The user may release an input touch event as illustrated in reference numeral <1220> within a preset time to immediately execute a corresponding function allocated to a function button or maintain the input touch event within the preset time to activate and display an option menu 1200 as illustrated in reference numeral <1230>.

The user may set an option value requested by the user according to movement of the touch event on the activated option menu 1200 as illustrated in reference numeral <1230> and then release the touch event as illustrated in reference numeral <1240>.

When a touch event is input to a function button in a certain mode and the touch event is released within the preset time, a unique function allocated to the function button may be immediately executed. When the touch event is input to the function button and maintained in a certain mode, the option menu 1200 is activated and displayed according to the touch event, and an option is set according to a given option menu 1200, When the touch event is released, a unique function allocated to the function button may be executed after reflecting the set option value.

As illustrated above, a second function associated with option setting is executed according to a touch event input to the function button, and a first function allocated to the function button may be executed with an option value set by the second function according to release of the touch event. A complex function may be operated using one touch based touch event input to one function button.

Figure 13:
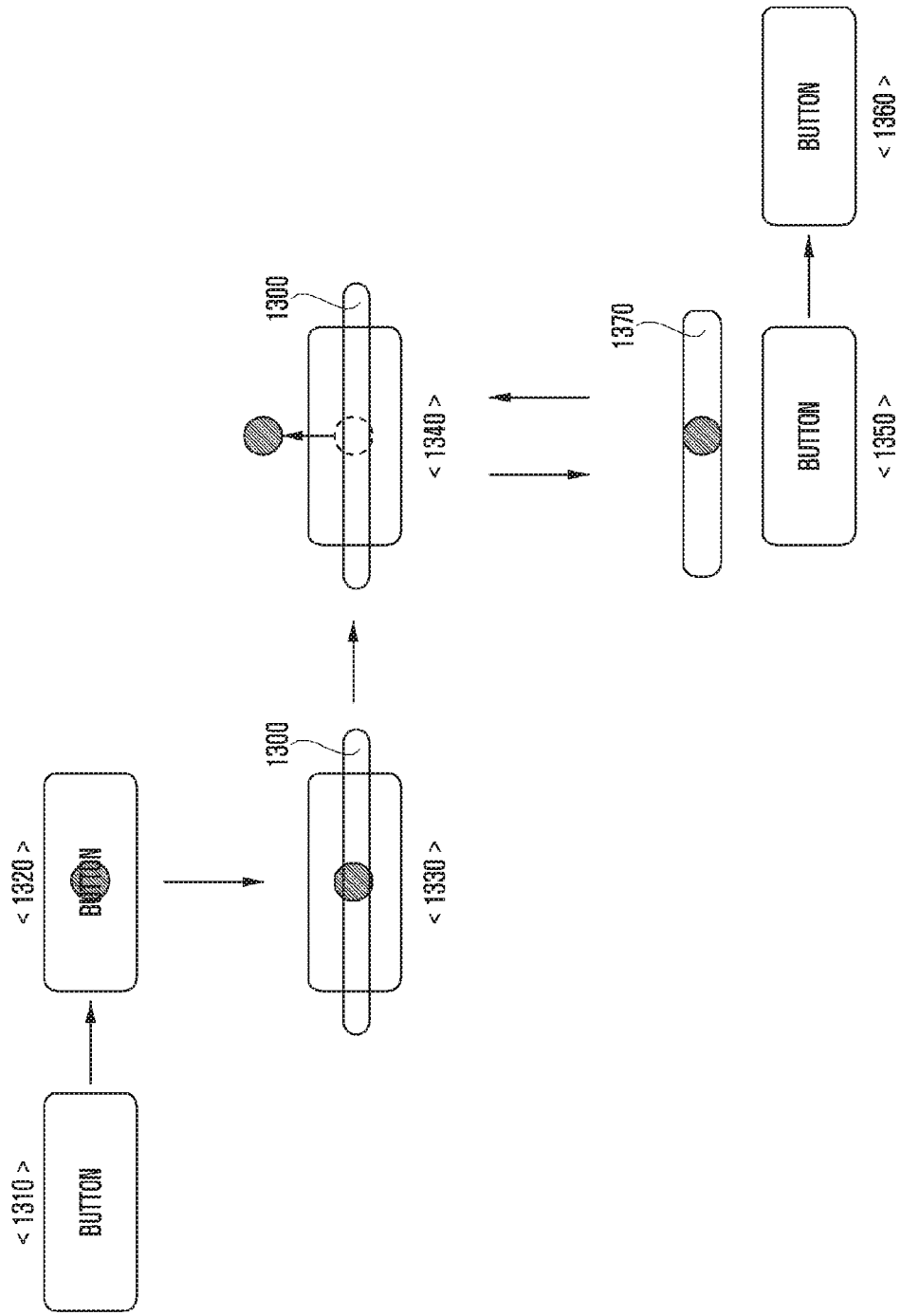
FIG. 13 is a diagram schematically illustrating an operation of setting a multi-option value by one touch input in a touch device according to an exemplary embodiment of the present invention.

FIG. 13 is a diagram schematically illustrating an operation of setting a multi-option value by one touch input in a touch device according to an exemplary embodiment of the present invention.

Referring to FIG. 13, as illustrated in reference numeral <1310>, a certain function button supportable in a certain mode may be provided through a function region 330. The user may input a touch event on the function button as illustrated in reference numeral <1320>. When the user maintains the input touch event by preset time, an option menu 1300 may be activated and displayed as illustrated in reference numeral <1330>.

The user may change an option value according to an interaction moved in a left or right direction in a state that the option menu 1300 is activated as illustrated in reference numeral <1330>. The user may also move the touch event upward and downward by a predetermined distance as illustrated in reference numeral <1340> to activate another option menu of a next depth in an activated state of the option menu 1300 as illustrated in reference numeral <1330>. As illustrated in reference numeral <1370>, a previously activated option menu 1300 is removed from the screen, and a new option menu 1370 of the next depth according to movement of the touch event may be activated and displayed in a located region of the touch event. Multi-stage option menus may be sequentially displayed according to movement of the touch event for activating an option menu of a different depth other than movement for controlling the option value. Similarly, an order reverse to the foregoing order may be achieved to activate an option menu 1300 of a previous depth in a state of reference numeral <1350>.

According to the exemplary embodiments described above, an operation is provided for removing a previously activated option menu on a screen during activation of the new option menu. However, exemplary embodiments of the present invention are not limited thereto. For example, the previously activated option menu may be removed from the screen as described above, or the activated state may be maintained, namely, display thereof on the screen. In this case, when the option menu is removed, a visual effect such as fade out is applied to the expression scheme to remove the option menu. Further, when maintaining the option menu, a visual effect converting the option menu into a semi-transparent form to display the option menu or a circle remains. When the new option menu is activated, a visual effect such as fade in is applied to display the new option menu.

The user may set an option value requested by the user according to movement of the touch event from the activated option menu 1370 as illustrated in reference numeral <1330>, and release a touch event as illustrated in reference numeral <1360>.

A changed and set option value during the release of the touch event may be at least one option value with respect to at least one option. When the user sets an option value by only a given option menu 1300 in a step of reference numeral <1330>, does not set an option value by a given option menu 1300 in a step of reference numeral <1330>, or sets an option value by only a given option menu 1070 in a step of reference numeral <1350>, only one option value may be reflected during release of the touch event.

When the user sets a first option value based on a given option menu in a step of reference numeral <1330> and sets a second option value based on a given option menu 1370 in a step of reference numeral <1350>, both the first option value and the second option value may be applied to an option value reflected during release of the touch event. When switching to the option menu 1370 after changing the first option value with respect to the option menu 1300, the first option value of the option menu 1300 may be temporarily stored. When the touch event is released after a second option value with respect to the option menu 1370 is set, the first option value of the option menu 1300 temporarily stored and an option value (namely, the second option value) of a point in which a touch event is released from the option menu 1370 are reflected to execute a function of the function button according to release of the touch event.

FIG. 13 illustrates an example where a touch event is moved upward or downward to switch an option menu of next depth or previous depth. This is determined according a case where a touch event for setting an option value in a given option menu according to the touch event is moved in a left or right direction. Accordingly, a touch event for switching an option menu of the next depth or the previous depth may be performed by moving in various directions distinguished from movement of a touch event for setting an option value. Movement of a touch event for activating an option value by depths is not always limited to a certain form. It will be appreciated that the movement of a touch event may be implemented by given inputs of various forms to distinguish types of touch events for activating an option menu by depths and changing an option value. Changing the option menu by depths for setting a multiple option value as illustrated in FIG. 13 may be supported by various schemes as well as a scheme moving a touch event. Such examples are indicated in FIGS. 14 to 16.

Figure 14:
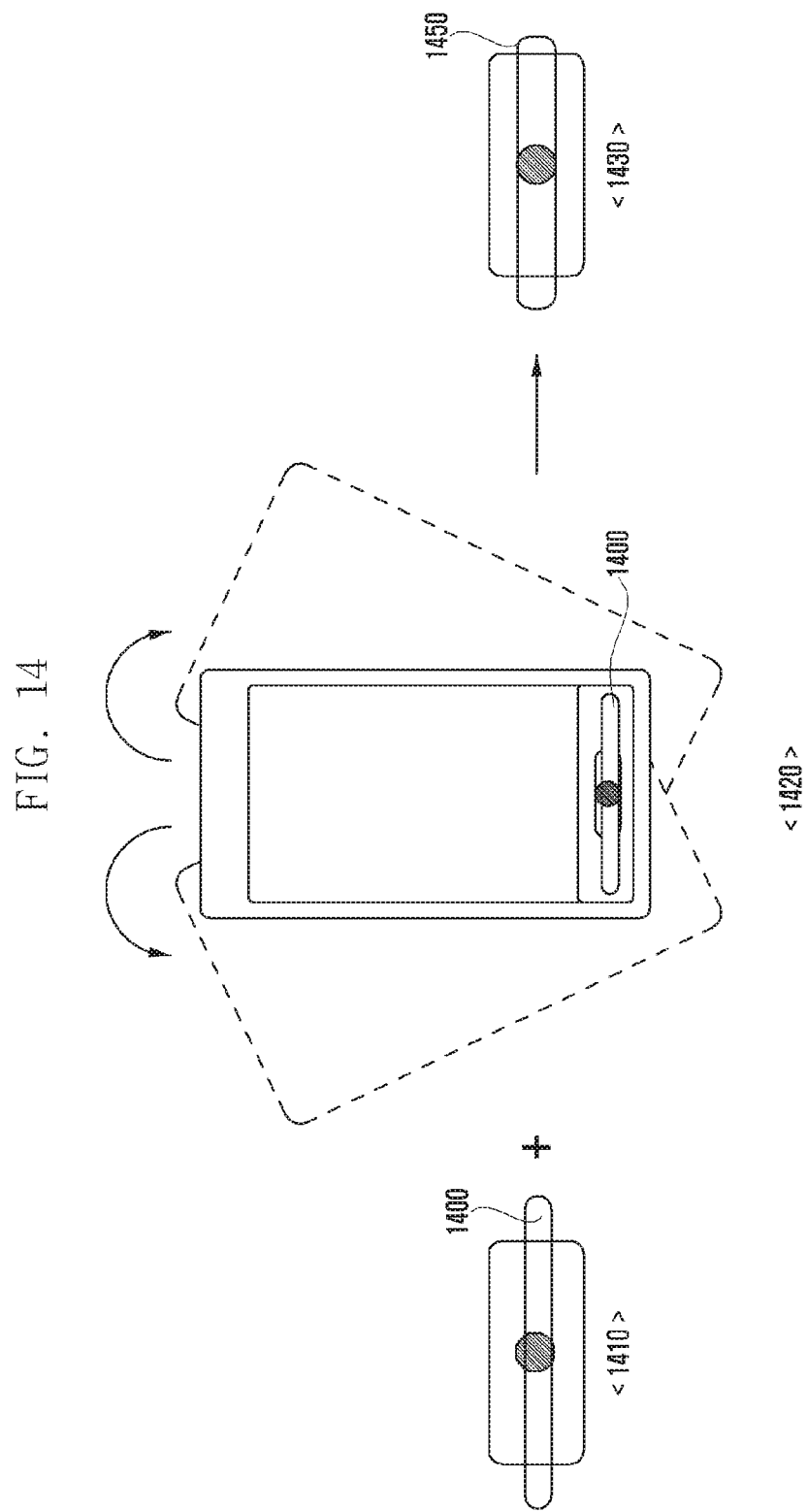
FIGS. 14 to 16 are diagrams illustrating examples of changing an option menu for setting a multi-option value in a touch device according to an exemplary embodiment of the present invention.
Figure 15:
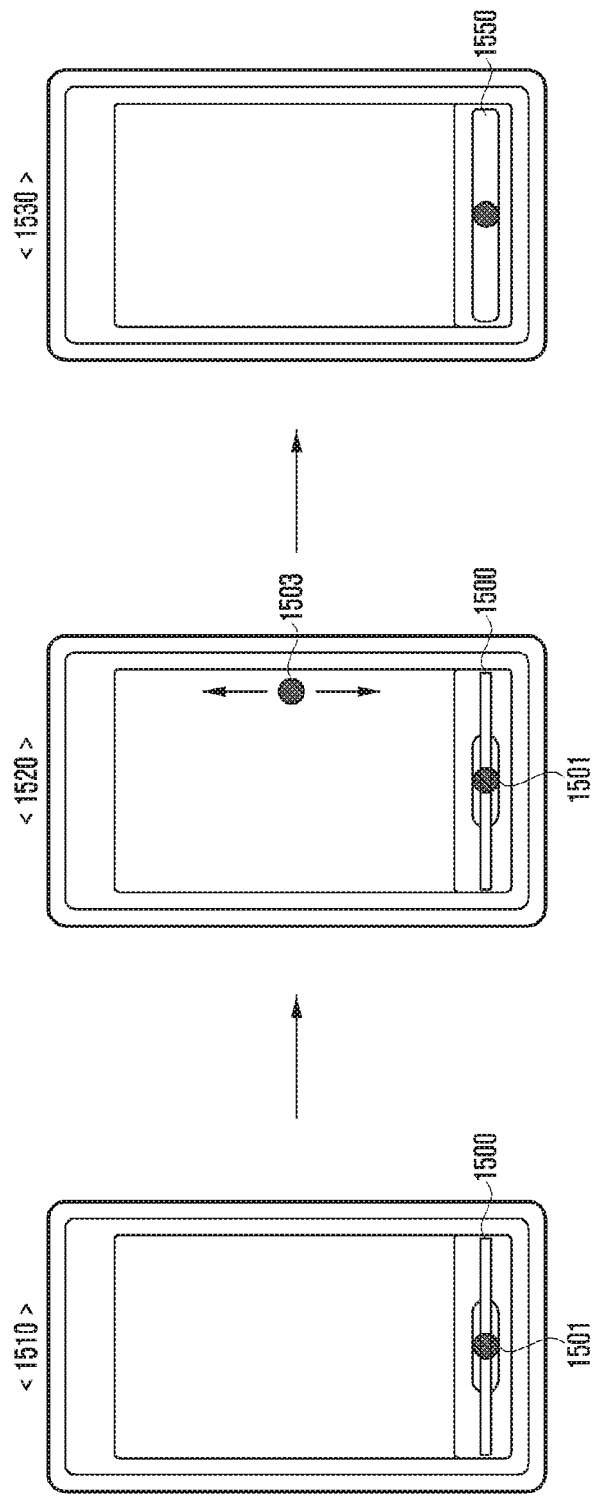
Figure 16:
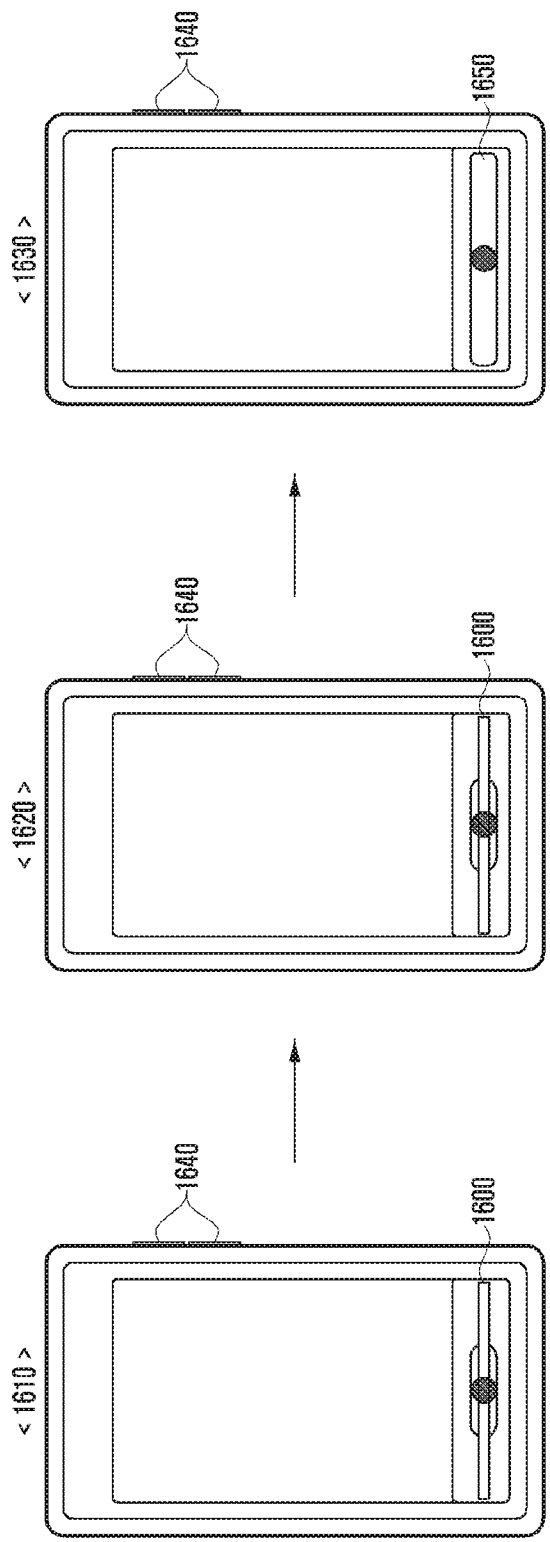

FIGS. 14 to 16 are diagrams illustrating examples of changing an option menu for setting a multi-option value in a touch device according to an exemplary embodiment of the present invention. FIG. 14 illustrates an example of an operation in a case of moving a touch device in a state that input of a touch event is fixed, FIG. 15 illustrates an example of an operation in a case of using additional touch event input (e.g., multi-touch event input) in a state that input of a touch event is fixed, and FIG. 16 illustrates an example of an operation in a case of using a hard key input in a state that input of a touch event is fixed.

Referring to FIG. 14, as illustrated in reference numeral <1410>, in a state that an option menu 1400 is activated by touch event input on a function button, the user may move a touch device in forward/rear/left/right directions while the touch event input on the function button. As illustrated in reference numeral <1430>, a new option menu 1450 is substituted and displayed on a function button on which the touch event remains instead of a previous option menu 1400. The user may sequentially activate multi-stage option menus such as an option menu of a next depth or an option menu of a previous depth by changing a posture of a touch device in a state of maintaining a touch event input to switch between option menus by depths. The touch device may include a sensor for determining posture information according to posture change of a touch device such as a motion sensor.

Referring to FIG. 15, as illustrated in reference numeral <1510>, in a state that an option menu 1500 is activated by input of the first touch event 1501 on a function button, the user may input a second touch event 1503 in one region of the display region 310 while maintaining the first touch event 1501 input on the function button to move it in up/down/left/right directions as illustrated in reference numeral <1520>. The second touch event 1503 may be input in one of the display region 310 or the function region 330. However, it is preferable to input the second touch event 1503 in the display region 310 in consideration of intuition. As illustrated in reference numeral <1530>, a new option menu 1550 may be displayed on a function button on which the first touch event remains instead of a previous option menu 1500. The user may sequentially activate multi-stage option menus such as an option menu or an option menu of a previous depth by moving a second touch event 1503 based on a multi-touch in a certain direction in a state of maintaining a first touch event 1501 input to switch between option menus by depths.

Referring to FIG. 16, as illustrated in reference numeral <1610>, in a state that an option menu 1600 is activated on a function button by touch event input, the user may input a hard key 1640 while maintaining the touch event input on the function button as illustrated in reference numeral <1620>. As illustrated in reference numeral <1630>, a new option menu 1650 may be substituted and displayed on a function button in which the touch event remains instead of a previous option menu 1600. The user may sequentially activate multi-stage option menus such as an option menu of a next depth or an option menu of a previous depth by operation using a hard key 1640 in a state of maintaining an input touch event to switch between option menus by depths.

As illustrated in FIGS. 14 to 16, multi-stage option menus according to an exemplary embodiment of the present invention may be switched to each other. Accordingly, the user may set a plurality of option values by option menus switched in real time while switching option menus and execute a function according to a function button in a certain mode based on a plurality of option values.

Figure 17:
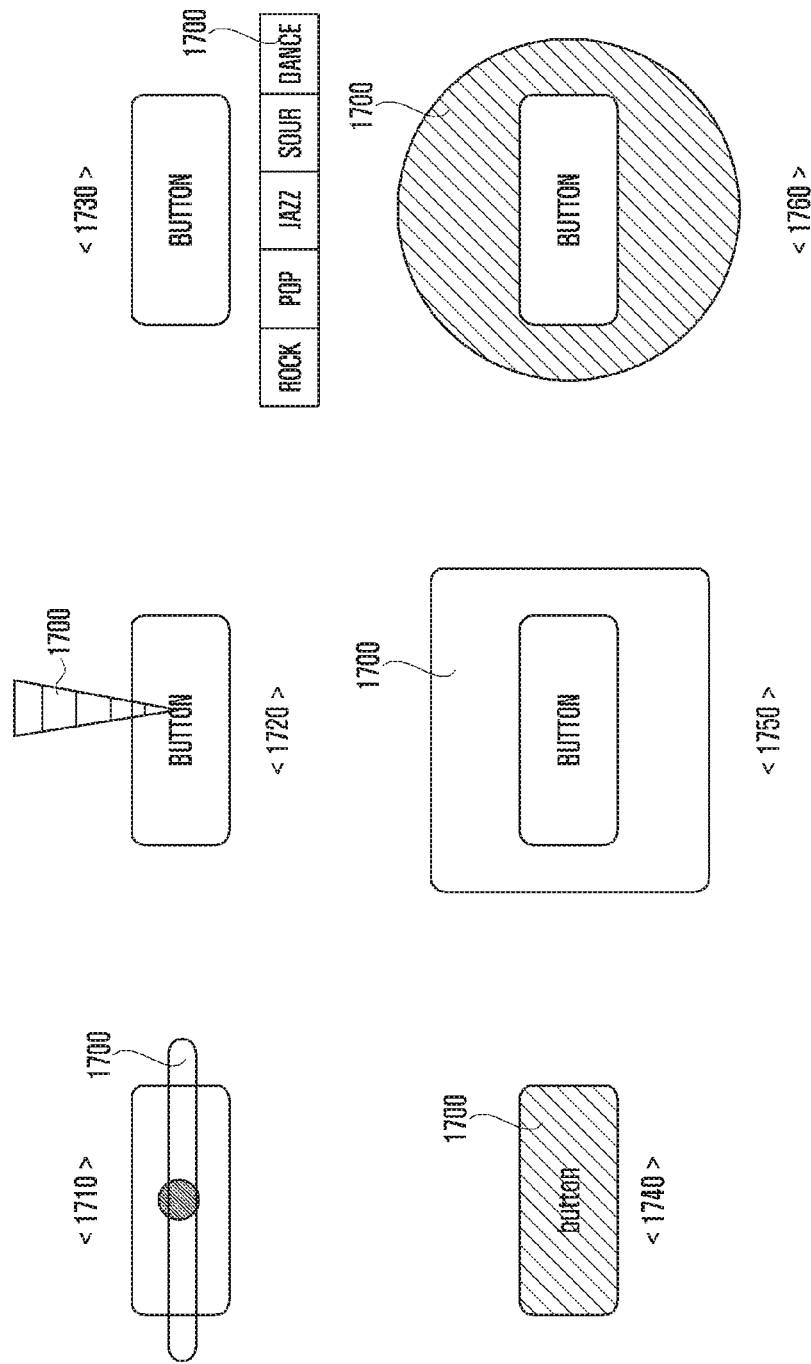
FIG. 17 is a diagram schematically illustrating various forms in which an option menu is provided in a touch device according to an exemplary embodiment of the present invention.

FIG. 17 is a diagram schematically illustrating various forms in which an option menu is provided in a touch device according to an exemplary embodiment of the present invention.

Referring to FIG. 17, reference numeral <1710> represents a case where an option menu 1700 is provided in a bar type in a landscape direction on a function button of the function region 330. Reference numeral <1720> represents a case where an option menu 1700 is provided in an inverted type of a transverse direction through the function region 330 and the display region 310. Reference numeral <1730> represents a case where an option menu 1700 is provided in a block type of a landscape on a peripheral region (displayed on the function region 310 or the display region 330) adjacent to a function button of the function region 330. Reference numeral <1740> represents a case where an option menu 1700 is provided using a function button itself of the function region 330. Reference numeral <1750> represents a case whether an option menu 1700 is provided in a square type surrounding a function button of the function region 330. Reference numeral <1760> represents a case where an option menu 1700 is provided in a circle type surrounding a function button of the function region 330. The option menu 1700 may be provided on a function button, a peripheral region or a display region 330 adjacent to the function button in a list type.

As described above, the option menu 1700 for setting an option value may be provided in one dimensional form or a multi-dimensional form without limiting a type, a direction, a size, a location. Accordingly, the option menu is not limited to the foregoing forms. It will be appreciated that the option menu may be implemented in various given forms such that the touch device changes an option based on one touch and executes a function.

Figure 18:
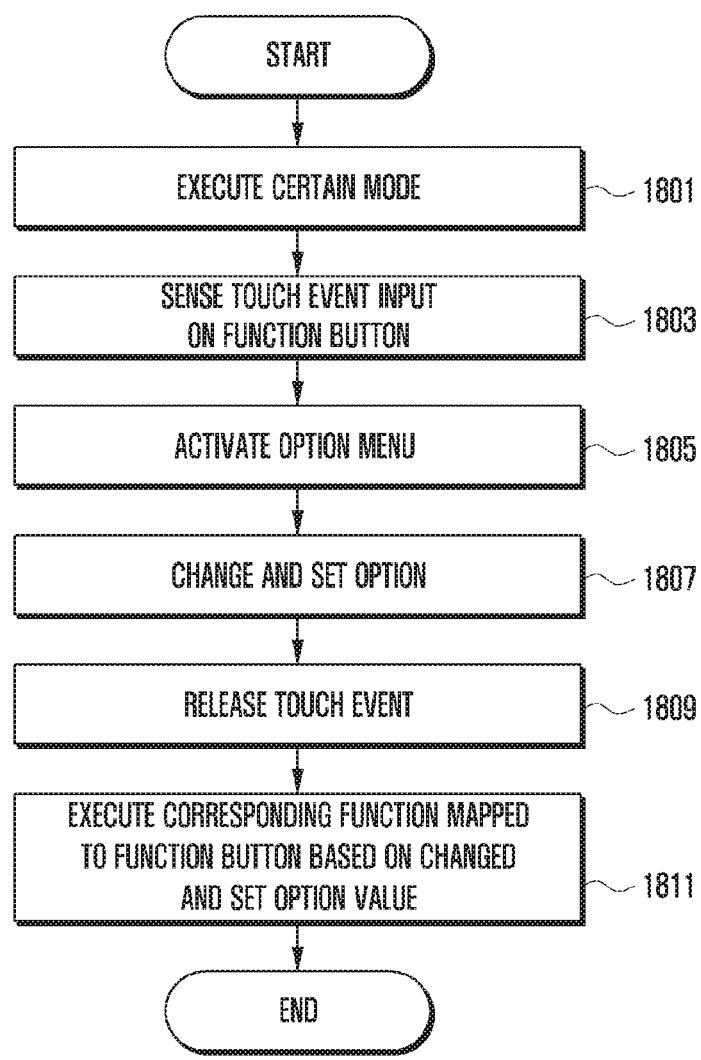
FIGS. 18 to 20 are flowcharts illustrating a method for controlling a function of a touch device according to an exemplary embodiment of the present invention.

FIG. 18 is a flowchart illustrating a method for controlling a function of a touch device according to an exemplary embodiment of the present invention.

Referring to FIG. 18, a controller 500 may execute a certain mode according to user selection in step 1801. For example, as illustrated above, the controller 500 may execute a mode such as a photographing mode, a messenger mode, a media mode (including a music mode, moving image mode, broadcasting mode) and control display of a corresponding execution screen.

The controller 500 may detect touch event input on a function button for controlling a function of a certain mode in a state that a certain mode is executed in step 1803. For example, as described above, the user may input a touch event on a certain function button such as a photographing button in a photographing mode, a playback button in a media mode, a recording button in a media mode, and a call button in a call mode.

When input of a touch event is detected on the function button, the controller 500 may activate and display an option menu in response thereto in step 1805. When the input of the touch event remains for a preset time, the controller 500 may activate the option menu.

The controller 500 may change and set an option value with respect to the option menu corresponding to movement of the touch in the activated option menu in step 1807. For example, when movement of the touch event is detected on the option menu after activation of the option menu, the controller 500 may change an option value according to the movement of the touch event and control display of a screen changed according to the changed option value.

The controller 500 may detect release of the input touch event in step 1809. For example, the user may change and set an option value according to movement of a touch event in the option menu and then release the touch event.

When the release of the touch event is detected, the controller 500 may control execution of a corresponding function mapped to the function button based on a changed and set option value in the option menu in step 1811.

For example, when the release of the touch event is detected after a white balance is set by a touch event input to a photographing button in a photographing mode, the controller 500 may control photographing with a white balance setting value changed according to the touch event. When a font color is set by a touch event input to a transmission button in a messenger mode, a font size is additionally set, and release of the touch event is detected, the controller 500 may control text transmission of a font color and a font size changed according to the touch event. When the release of the touch event is detected after a recording time is set by a touch event input to a recording button in a broadcasting mode, the controller 500 may control recording based a recoding time set according to the touch event.

Figure 19:
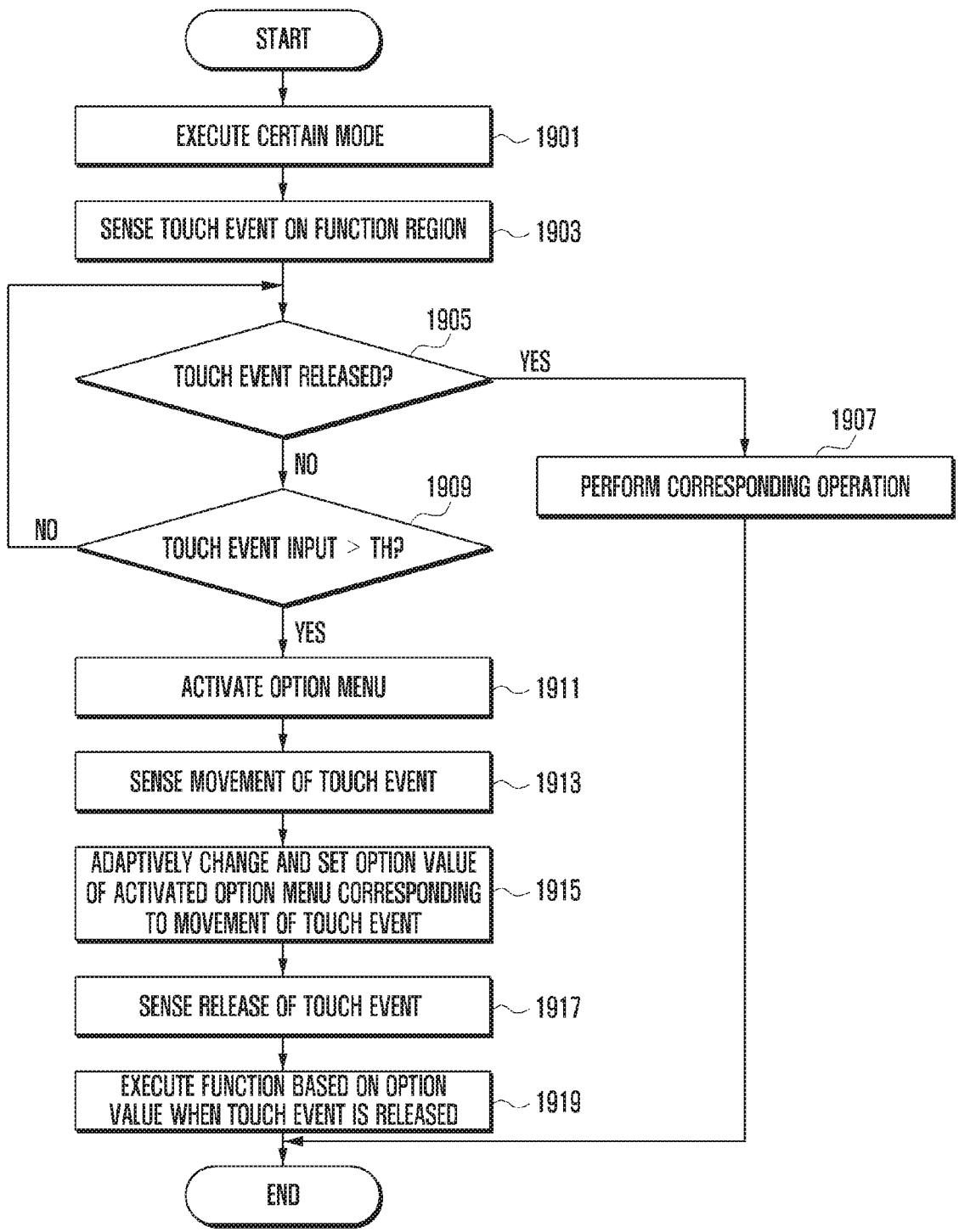

FIG. 19 is a flowchart illustrating a method for operation a complex function based on one touch in a touch device according to an embodiment of the present invention.

Referring to FIG. 19, the controller 500 may execute a certain mode according to user selection in step 1901. As described above, the certain mode may be one of a photographing mode, a messenger mode, a music mode, a moving image mode, a broadcasting mode, and a call mode. The controller 500 may display the display region 310 and the function region 330 divided corresponding to the certain mode during execution of the certain mode.

The controller 500 may detect a touch event input on a function region in step 1903. The touch event may be input on a certain function button among at least one function button provided in the certain mode on the function region 330.

The controller 500 may determine whether the input touch event is released in step 1905. The controller 500 may determine whether the input touch event is released within a preset threshold time. When the input touch event is released within a preset threshold time (YES of step 1905), the controller 500 may control execution of a corresponding operation in step 1907. For example, the controller 500 may control execution of a function allocated to the function button given in the certain mode. Similarly, the controller 500 may control a photographing function allocated to a photographing button in a photographing mode, a transmission function allocated to a transmission button in a messenger mode, a recording function allocated to a recording button in a broadcasting mode, and a playback function allocated to a playback button in a media mode.

When the input touch event is not released (NO of step 1905), the controller 500 may determine whether the touch event is input for greater than a preset threshold time in step 1909. When the touch event is not input for greater than a preset threshold time (NO of step 1909), the process goes to step 1905 and repeats the foregoing procedures. When the touch event is input for greater than a preset threshold time (YES of step 1909), the controller 500 may activate and display an option menu allocated to the function button in step 1911.

At least one option menu may be allocated to a function button. If a plurality of option menus are allocated, an option menu of a priority may be initially activated and displayed according to a previously defined priority. As described above, an option menu initially provided according to the touch event may be set during manufacture or by user setting. The option menu may be provided on the function button in an overlay form, around the function button, or at a preset location of the display region. A providing form of the option menu may be determined according to a type of a function button selected in an executed certain mode and a corresponding certain mode, and may be indicated in a certain location according to user setting.

The controller 500 may detect movement of the touch event on the option menu in step 1913. The controller 500 may adaptively change and set an option value of the activated option menu corresponding to the movement of the touch event in step 1915. When the movement of the touch event is detected after activating the option menu, the controller 500 may change an option value based on a corresponding option menu according to the movement of the touch event and provide information with respect to the changed option value through a screen.

The controller 500 may detect release of the input touch event in step 1917. For example, the user may set a desired option value by movement of a touch event in the option menu and release a touch event moved to an option menu region in a corresponding point to which an option value is set to change the option value.

When the release of the touch event is detected, the controller 500 may control execution of a corresponding function based on an option value when the touch event is released. When the release of the touch event is detected, the controller 500 may control execution of a corresponding function allocated to the function button based on an option value of a corresponding point of an option menu region in which the touch event is released in step 1919.

Figure 20:
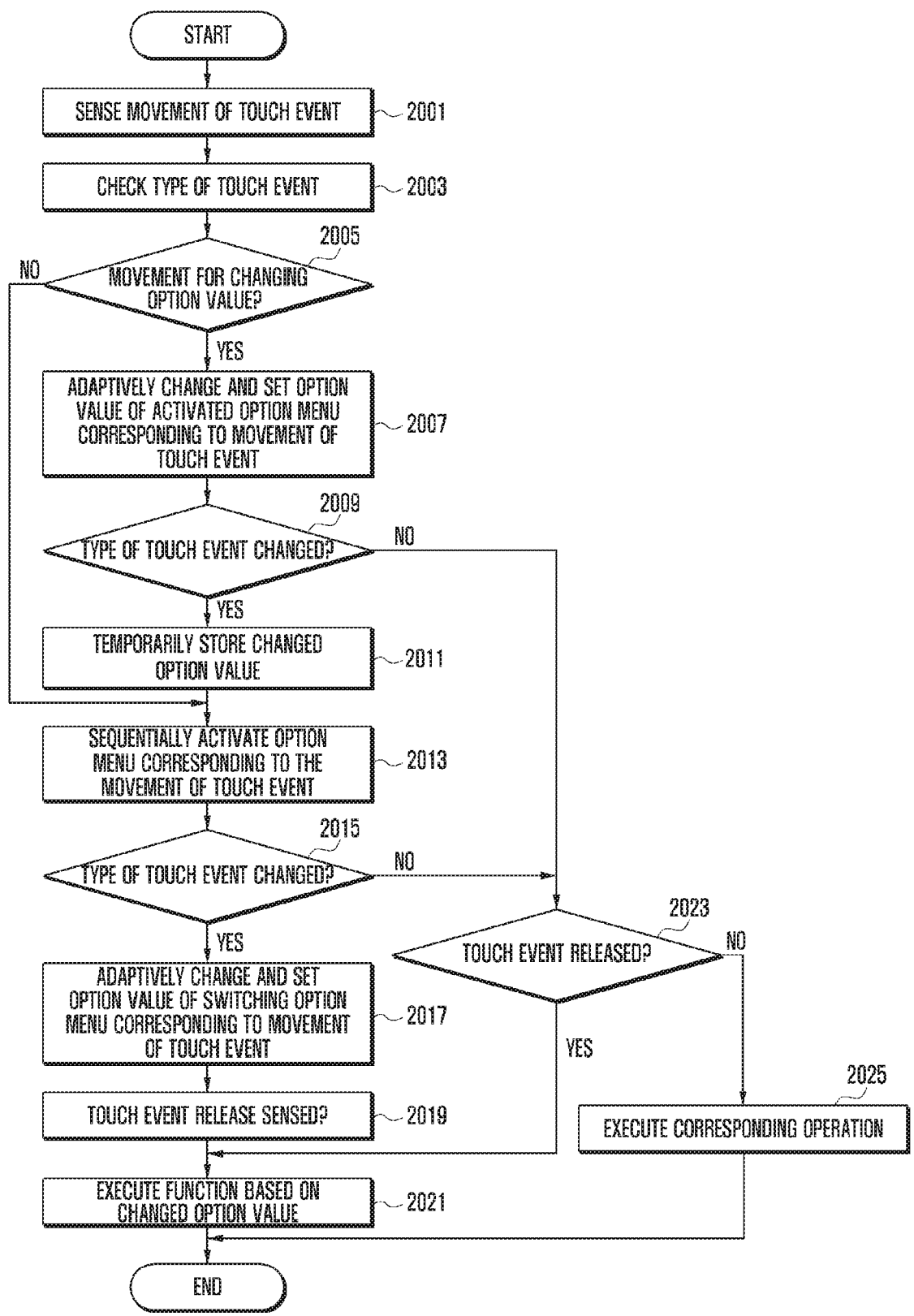

FIG. 20 is a flowchart illustrating a method for executing a function by setting multi-options in a touch device according to an embodiment of the present invention.

Referring to FIG. 20, the controller 500 may detect movement of a touch event in an activated state of an option menu in step 2001. FIG. 20 illustrates an operation of detecting movement of the touch event in a state that a certain mode is executed and an option menu is activated and displayed according to a touch event to a function button given in the certain mode.

When detecting the moving of the touch event, the controller 500 may identify a type of the touch event in step 2003, and determine whether the movement of the touch event is movement for changing an option value in step 2005. The controller 500 may determine whether the movement of the touch event is a moved interaction for changing an option value in the option menu or a moved interaction for calling an option menu having depth (e.g., next depth or previous depth) different from depth of the activated option menu.

A following operation illustrates an operation of an embodiment starting when the movement of the touch event is the moved interaction for changing an option value as the determination result at step 2005.

When the movement of the touch event is the moved interaction for changing an option value as the determination result at step 2005 (YES of step 2005), the controller 500 may adaptively change and set an option value of the activated option menu corresponding to the movement of the touch event in step 2007. When the movement of the touch event is detected on the option menu after activating the option menu, the controller 500 may change an option value based on a corresponding option menu according to movement of the touch event in real time and provide information with respect to the change option value through a screen.

The controller 500 may determine whether the type of the touch event is changed while changing the option value of the option menu corresponding to the movement of the touch event in step 2009. For example, the controller 500 may determine whether there is a type change request requesting movement of the touch event to a moving direction for calling an option menu having depth (e.g., next depth or previous depth) different from depth of the option menu.

When the type of the touch event is not changed (NO of step 2009), the controller 500 may determine whether the touch event is released (2023). When the touch event is released (YES of step 2023), the controller 500 may control execution of a corresponding function of the function button based on the changed option value in step 2021. When the touch event is not released (NO of step 2023), the controller 500 may control execution of a corresponding operation in step 2025. For example, the controller 500 may go to step 2005 to control following operations, or control an operation of initializing a changed and set option value corresponding to user input for initializing the executed operation.

When the type of the touch event is changed (YES of step 2009), the controller 500 may temporarily store the changed option value due to the touch event in the option menu in step 2011. The controller 500 may sequentially activate an option menu having depth (e.g., next depth or previous depth) different from depth of the option menu corresponding to the movement of the touch event due to change in the type of the touch event in step 2013.

The controller 500 may determine whether the type of the touch event is changed in a state that an option menu of certain depth due to the operation is activated in step 2015. For example, the controller 500 may determine whether there is a type change request requesting movement of the touch event to a direction for changing an option value in the switching option menu.

When the type of the touch event is not changed, the controller 500 (NO of step 2015), the controller 500 may determine whether the touch event is released in step 2023. When the touch event is released (YES of step 2023), the controller 500 may control execution of a corresponding function of the function button based on a changed option value with respect to an option menu of step 2007 in step 2021. When the touch event is not released (NO of step 2023), the controller 500 may control execution of a corresponding operation in step 2025.

When the type of the touch event is changed (YES of step 2015), the controller 500 may adaptively change and set an option value of the switching option menu corresponding to the movement of the touch event in step 2017. The controller 500 repeatedly performs the foregoing operation, and may control execution of a corresponding function of a function button based on a plurality of option values with respect to a plurality of option menus like an option value changed with respect to an option menu of step 2007 and an option value changed with respect to a switch option menu of steps 2013 and 2017 in step 2021 when detecting the release of the touch event in step 2019.

A following operation illustrates an operation of an embodiment starting when the type of the touch event is movement for activating an option menu of different depth as the determination result at step 2005.

As the determination result of step 2005, when the type of the touch event is not the movement for changing an option value (NO of step 2005), that is, when the type of the touch event is movement for activating an option menu of different depth (next depth or previous depth), the controller 500 may sequentially activate an option menu having depth (e.g., next depth or previous depth) different from that of the option menu corresponding to the movement of the touch event.

The controller 500 may determine whether the type of the touch event is changed in a state that an option menu of a certain depth is activated in step 2015. For example, the controller 500 may determine whether there is a type change request requesting movement of the touch event to a direction for changing an option value in the switching option menu in a state that an option menu (switching option menu) of certain depth is activated due to the movement of the touch event.

When the type of the touch event is not changed (NO of step 2015), the controller 500 may determine whether the touch event is released in step 2023. When the touch event is released (YES of step 2023), the controller 500 may control execution of a corresponding function of a function button without changing an option value in step 2021. When the touch event is not released (NO of step 2023), the controller 500 may perform a corresponding operation in step 2025. For example, the controller 500 may go to step 2005 and repeat the foregoing procedures.

When the type of the touch event is changed (YES of step 2015), the controller 500 may adaptively change and set an option value of the switching option menu corresponding to the movement of the touch event in step 2017. When the touch event is released in step 2019, the controller 500 may control execution of a corresponding function of a function button based on an option value changed with respect to the switching option menu of steps 2013 and 2017 in step 2021.

The foregoing method for controlling a function in a touch device according to exemplary embodiments of the present invention may be implemented in an executable program command form by various computer means and be recorded in a computer readable recording medium. In this case, the computer readable recording medium may include a program command, a data file, and a data structure individually or a combination thereof. The program command recorded in a recording medium may be specially designed or configured for the present invention or be known to a person having ordinary skill in a computer software field to be used.

It will be appreciated that embodiments of the present invention can be realized in the form of hardware, software or a combination of hardware and software. Any such software may be stored in the form of volatile or non-volatile storage such as, for example, Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. It will be appreciated that the storage devices and storage media are embodiments of machine-readable storage that are suitable for storing a program or programs comprising instructions that, when executed, implement embodiments of the present invention. Further, the program command includes a machine language code created by a complier and a high-level language code executable by a computer using an interpreter. The foregoing hardware device may be configured to be operated as at least one software module to perform an operation of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, in the method and the apparatus for controlling a function of a touch device according to exemplary embodiments of the present invention, option setting and function execution may be rapidly and intuitively performed according to a touch event input to a function button in a certain mode during performing. An option value may be changed according to a touch event input to a function button, and a corresponding function allocated to the function button may be executed with the changed option value during release of the touch event.

According to exemplary embodiments of the present invention, when a function according to option change in a certain mode of the touch device is executed, the input number of the user may be minimized to intuitively and rapidly change an option and to execute a function. For example, when a photographing function is executed through option change in a photographing mode, only a simple touch input may cause a photographing function due to option change to be rapidly executed. Accordingly, satisfaction of the user with respect to execution of a function through option change in a certain mode may be increased and difficult change of the option value may be intuitively and easily set.

Exemplary embodiments of the present invention may be implemented in various types of touch devices and various devices corresponding thereto. An optimal environment for supporting execution of a function through option change may be realized in the touch device. Accordingly, exemplary embodiments of the present invention may efficiently and conveniently use a touch device during an operation of a function by certain modes to be executed in the touch device, thereby improving convenience for a user, usability and competitive force of the touch device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a display;
   a memory; and
   at least one processor operatively coupled with the memory and the display, the at least one processor is configured to:
   display a call mode screen comprising at least one button provided in a call mode on the display,
   detect a first touch input on a first button of the at least one button,
   display a first option menu comprising at least one option key relating to a call function assigned to the first button,
   select an option key of the at least one option key according to movement and release of the first touch input, and
   perform the call function assigned to the first button with a function of the selected option key.

2. The electronic device of claim 1, wherein the at least one button comprises at least one of a voice call button, a video call button, or a message button.

3. The electronic device of claim 1, wherein the first button is a voice call button and the call function assigned to the first button is a transmission of a voice call.

4. The electronic device of claim 3, wherein the first option menu comprises at least one option key for a keypad, a speaker phone, a mute, or a video call.

5. The electronic device of claim 4, wherein at least one processor is further configured to:
   when a key for the speaker phone is selected according to the movement and release of the first touch input, perform the transmission of the voice call with a speaker phone mode.

6. The electronic device of claim 1, wherein at least one processor is further configured to:
   when the first touch input on the first button is released before a preset threshold time, perform the call function with a default option.

7. The electronic device of claim 1, wherein at least one processor is further configured to:
   when the first touch input on the first button is maintained over a preset threshold time, display the first option menu.

8. The electronic device of claim 1, wherein the first button is a message button and the call function assigned to the first button is transmission of a message.

9. The electronic device of claim 8, wherein the first option menu comprises at least one option key for changing at least one of a font type, a size or a color of the message.

10. The electronic device of claim 1, wherein the at least one processor is further configured to:
    display, in response to detecting a second touch input while the first option menu is displayed, a second option menu different from the first option menu, and
    change an option value relating to the second option menu according to a movement in a direction of the second touch input.

11. The electronic device of claim 10, wherein the second touch input is one of a touch movement in the direction or a touch input detected an area other than the first button.

12. A method comprising:
    displaying a call mode screen comprising at least one button provided in a call mode on a display of an electronic device;
    detecting a first touch input on a first button of the at least one button;
    displaying a first option menu comprising at least one option key relating to a call function assigned to the first button;
    selecting an option key of the at least one option key according to movement and release of the first touch input; and
    performing the call function assigned to the first button with a function of the selected option key.

13. The method of claim 12, wherein the at least one button comprises at least one of a voice call button, a video call button, or a message button.

14. The method of claim 12, wherein the first button is a voice call button and the call function assigned to the first button is a transmission of a voice call.

15. The method of claim 14, wherein the first option menu comprises at least one option key for a keypad, a speaker phone, a mute, or a video call.

16. The method of claim 15, wherein the performing of the call function comprises:
   when a key for the speaker phone is selected according to the movement and release of the first touch input, performing the transmission of the voice call with a speaker phone mode.

17. The method of claim 12, wherein the performing of the call function comprises:
   when the first touch input on the first button is released before a preset threshold time, performing the call function with a default option.

18. The method of claim 12, wherein the displaying of the first option menu comprises:
   when the first touch input on the first button is maintained over a preset threshold time, displaying the first option menu.

19. The method of claim 12, wherein the first button is a message button and the call function assigned to the first button is a transmission of a message.

20. The method of claim 19, wherein the first option menu comprises at least one option key for changing at least one of a font type, a size or a color of the message.

\* \* \* \* \*